(12) United States Patent
Noguchi

(10) Patent No.: US 12,029,987 B2
(45) Date of Patent: Jul. 9, 2024

(54) IMAGE PROCESSING APPARATUS, IMAGE PROCESSING METHOD, IMAGE PROCESSING PROGRAM, AND RECORDING MEDIUM STORING IMAGE PROCESSING PROGRAM

(71) Applicant: FUJIFILM Corporation, Tokyo (JP)

(72) Inventor: Yukinori Noguchi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 832 days.

(21) Appl. No.: 17/111,217

(22) Filed: Dec. 3, 2020

(65) Prior Publication Data
US 2021/0090312 A1    Mar. 25, 2021

Related U.S. Application Data

(63) Continuation of application No. PCT/JP2019/020205, filed on May 22, 2019.

(30) Foreign Application Priority Data

Jun. 15, 2018  (JP) ................ 2018-114370

(51) Int. Cl.
   G06T 11/60      (2006.01)
   A63F 13/537     (2014.01)
   (Continued)

(52) U.S. Cl.
   CPC .......... *A63F 13/80* (2014.09); *A63F 13/537* (2014.09); *G06F 18/22* (2023.01);
   (Continued)

(58) Field of Classification Search
   CPC .......... G06V 10/40; G06F 18/22; G06T 11/60
   See application file for complete search history.

(56) References Cited

U.S. PATENT DOCUMENTS

| 6,907,141 B1 | 6/2005 | Okamoto |
| 2012/0236176 A1 | 9/2012 | Kita |

(Continued)

FOREIGN PATENT DOCUMENTS

| JP | 2000-163576 A | 6/2000 |
| JP | 2001-228528 A | 8/2001 |

(Continued)

OTHER PUBLICATIONS

An Office Action; "Notice of Reasons for Refusal," mailed by the Japanese Patent Office on Dec. 21, 2021, which corresponds to Japanese Patent Application No. 2020-525384 and is related to U.S. Appl. No. 17/111,217 with English language translation.

(Continued)

*Primary Examiner* — Sam Bhattacharya
(74) *Attorney, Agent, or Firm* — Studebaker & Brackett PC

(57) ABSTRACT

Provided are an image processing apparatus, an image processing method, an image processing program, and a recording medium storing the image processing program, in which how similar images are combined is relatively understood. An image to be classified is dragged and dropped into a first classification window, and a designation classification button or an automatic classification button is pressed. In a case where the designation classification button is pressed, images are classified into groups having the number of groups input to a group number input window, and in a case where the automatic classification button is pressed, the images are classified into groups having the number of groups automatically determined. A representative image is determined for each group, and the determined representative image is displayed. In a case where the representative image is selected, the images included in the group represented by the selected representative image are displayed.

18 Claims, 32 Drawing Sheets

(51) Int. Cl.
*A63F 13/80* (2014.01)
*G06F 18/22* (2023.01)
*G06F 18/2431* (2023.01)
*G06T 11/00* (2006.01)
*G06V 10/40* (2022.01)
*G06V 10/762* (2022.01)
*G06F 3/0482* (2013.01)

(52) U.S. Cl.
CPC ........ *G06F 18/2431* (2023.01); *G06T 11/001* (2013.01); *G06T 11/60* (2013.01); *G06V 10/40* (2022.01); *G06V 10/763* (2022.01); *G06F 3/0482* (2013.01); *G06T 2200/24* (2013.01); *G06T 2207/20004* (2013.01); *G06T 2207/20076* (2013.01)

(56) References Cited

U.S. PATENT DOCUMENTS

| | | | |
|---|---|---|---|
| 2013/0222696 | A1 | 8/2013 | Yamazaki et al. |
| 2015/0095825 | A1 | 4/2015 | Yamamoto |
| 2016/0054845 | A1 | 2/2016 | Takahashi et al. |
| 2016/0247300 | A1 | 8/2016 | Takata et al. |
| 2017/0255825 | A1 | 9/2017 | Saito |

FOREIGN PATENT DOCUMENTS

| | | | |
|---|---|---|---|
| JP | 2001-256244 | A | 9/2001 |
| JP | 2005-049968 | A | 2/2005 |
| JP | 2007-058792 | A | 3/2007 |
| JP | 2009-237703 | A | 10/2009 |
| JP | 2010-191711 | A | 9/2010 |
| JP | 2010-246134 | A | 10/2010 |
| JP | 2012-048641 | A | 3/2012 |
| JP | 2012-195679 | A | 10/2012 |
| JP | 2013-179402 | A | 9/2013 |
| JP | 2014-119810 | A | 6/2014 |
| JP | 2015-069598 | A | 4/2015 |
| JP | 2016-157436 | A | 9/2016 |
| JP | 2017-038161 | A | 2/2017 |
| JP | 6132996 | B1 | 5/2017 |
| JP | 2017-156915 | A | 9/2017 |
| WO | 2014162659 | A1 | 10/2014 |

OTHER PUBLICATIONS

An Office Action; "Notice of Reasons for Refusal," mailed by the Japanese Patent Office on Jul. 19, 2022, which corresponds to Japanese Patent Application No. 2020-525384 and is related to U.S. Appl. No. 17/111,217; with English language translation.

International Search Report issued in PCT/JP2019/020205; mailed Jul. 30, 2019.

International Preliminary Report On Patentability and Written Opinion issued in PCT/JP2019/020205; issued Dec. 15, 2020.

An Office Action; "Decision of Refusal," mailed by the Japanese Patent Office on Jan. 17, 2023, which corresponds to Japanese Patent Application No. 2020-525384 and is related to U.S. Appl. No. 17/111,217 with English language translation.

IMAGE PROCESSING APPARATUS, IMAGE PROCESSING METHOD, IMAGE PROCESSING PROGRAM, AND RECORDING MEDIUM STORING IMAGE PROCESSING PROGRAM

CROSS-REFERENCE TO RELATED APPLICATIONS

This application is a Continuation of PCT International Application No. PCT/JP2019/020205 filed on May 22, 2019, which claims priority under 35 U.S.C. § 119(a) to Japanese Patent Application No. 2018-114370 filed on Jun. 15, 2018. Each of the above application(s) is hereby expressly incorporated by reference, in its entirety, into the present application.

BACKGROUND OF THE INVENTION

1. Field of the Invention

The present invention relates to an image processing apparatus, an image processing method, an image processing program, and a recording medium storing the image processing program.

2. Description of the Related Art

In a case where a large number of images are captured, it takes a long time for the user to select images one by one and combines the images of the same main subject. Therefore, it is considered to classify the images automatically. For example, there is a method of classifying one folder into about 50 images (JP2005-049968A) and improving the search accuracy of an image partially similar to a desired image (JP2000-163576A). In addition, in a case where a person image is classified for each person, there are a method for displaying a representative thumbnail image of the classified person image (JP2015-069598A), a method for displaying a representative image of a class by dividing an image into a plurality of classes (JP6132996B), and a method for displaying an image selected from images included in a group as a representative image (WO2014/162659A).

SUMMARY OF THE INVENTION

However, in the case of those described in JP2005-049968A and JP2015-069598A, the contents of the image represented by the representative image are difficult to understand, and in the case of those described in JP2000-163576A, the representative image is not considered at all. In addition, in the case of those described in JP6132996B and WO2014/162659A, it is not considered to select a representative image, so that the contents of the image represented by the representative image are difficult to understand.

An object of the present invention is to make it possible to relatively easily understand what kind of image is combined in a case where a plurality of images are combined and displayed for each similar image.

An image processing apparatus according to an aspect of the present invention is characterized by comprising an image classification device (image classification means) for classifying a plurality of images into a plurality of groups for images similar to each other in response to a classification command, a representative image display control device (representative image display control means) for displaying an image representing the group for each group classified by the image classification device on a display screen of a display apparatus, a representative image selection device (representative image selection means) for selecting at least one representative image from among representative images displayed under control of the representative image display control device, and a similar image display control device (similar image display control means) for displaying an image included in a group represented by the representative image selected by the representative image selection device on the display screen of the display apparatus.

The present invention also provides a method suitable for an image processing apparatus. That is the method is characterized by classifying a plurality of images into a plurality of groups for images similar to each other in response to a classification command, by an image classification device (image classification means), displaying an image representing the group for each group classified by the image classification device on a display screen of a display apparatus, by a representative image display control device (representative image display control means), selecting at least one representative image from among representative images displayed under control of the representative image display control device, by a representative image selection device (representative image selection means), and displaying an image included in a group represented by the representative image selected by the representative image selection device on the display screen of the display apparatus, by a similar image display control device (similar image display control means).

The image processing apparatus may comprise a processor, and the processor may classify a plurality of images into a plurality of groups for images similar to each other in response to a classification command, display an image representing the group for each classified group on a display screen of a display apparatus, select at least one representative image from among displayed representative images, and display an image included in a group represented by the selected representative image on the display screen of the display apparatus.

The present invention can be read by a computer of an image processing apparatus, and provides a program for controlling the computer of the image processing apparatus and a recording medium storing the program.

The image classification device further classifies the image displayed by the similar image display control device into a plurality of groups for more similar images in response to the classification command, for example.

Further, the image processing apparatus may comprise a group number input device (group number input means) for inputting the number of groups to be classified in the image classification device. In this case, the image classification device performs, for example, a first stage classification that classifies a plurality of images into a plurality of groups for images similar to each other in response to the classification command, and the image classification device performs a second stage classification that combines groups having similar images included in the groups among the groups obtained by the first stage classification such that the number of groups obtained by the first stage classification becomes the number of groups input from the group number input device in a case where the number of groups obtained by the first stage classification is larger than the number of groups input from the group number input device.

The image classification device may perform the second stage classification that divides the images in the group obtained by the first stage classification such that the number of groups obtained by the first stage classification becomes the number of groups input from the group number input device in a case where the number of groups obtained by the first stage classification is smaller than the number of groups input from the group number input device.

The image processing apparatus may further comprise an automatic classification command input device (automatic classification command input means) for inputting an automatic classification command of the group and a threshold value input device (threshold value input means) for inputting a threshold value of similarity indicating whether or not the images are similar. In this case, the image classification device performs, for example, a first stage classification that classifies a plurality of images into a plurality of groups for images similar to each other in response to the automatic classification command, and the image classification device performs a second stage classification that combines the first group and the second group in a case where the similarity indicating whether or not the images included in the first group and the images included in the second group among the plurality of groups obtained in the first stage classification are similar (including whether or not the entire image included in the first group is similar to the entire image included in the second group) and whether or not image composition for shuffle printing is performed again is within the threshold value input from the threshold value input device.

The image processing apparatus may further comprise a list display command input device (list display command input means) for inputting list display command, and a list display control device (list display control means) for displaying a list of the images included in the group represented by the representative image selected by the representative image selection device in a list display window displayed on the display screen of the display apparatus in response to input of the list display command from the list display command input device.

The image processing apparatus may further comprise a first designation device (first designation means) for designating a ratio or the number of images displayed in the list display window among the images included in the group represented by the representative image selected by the representative image selecting device. In this case, the list display control device displays, for example, the list of images in the list display window on the basis of the ratio or the number of images designated by the first designation device.

The image processing apparatus may further comprise a second designation device (second designation means) for designating a ratio or the number of images that are more similar to each other among the images displayed in the list in the list display window. In this case, the list display control device may display, for example, the list of images in the list display window on the basis of the ratio or the number of images designated by the second designation device.

The image processing apparatus may further comprise a third designation device (third designation means) that designates the ratio or number of images to be displayed in the list display window among the ratio or number of images designated by the second designation device. In this case, the list display control device displays, for example, the list of images in the list display window on the basis of the ratio or the number of images designated by the third designation device.

The image processing apparatus may further comprise a display form setting device (display form setting means) for setting a display form of an image displayed in the list display window. In this case, the list display control device may display the image in the list display window according to the display form set by the display form setting device.

The display form set by the display form setting device is, for example, at least one of an aspect ratio of an image, a size of a margin between images, a color of a margin between images, or a ratio of a large image.

The image processing apparatus may further comprise a margin color decision device (margin color decision means) for deciding a color of a margin between the images displayed in the list display window on the basis of colors of the images displayed in the list display window.

For example, the list display control device displays the images included in the group represented by the representative image selected by the representative image selection device to be packed in a print display frame on one sheet in the list display window.

The image processing apparatus may comprise an evaluation value calculation device (evaluation value calculation means) for calculating the evaluation value of the image on the basis of the content of the image. In this case, the list display control device obtains an evaluation value by the evaluation value calculation device for each of the images included in the group represented by the representative image selected by the representative image selection device, and displays an image having a high evaluation value in a larger size than other images.

The image processing apparatus may further comprise the image pall rearrangement device for, with respect to a designated image among the images displayed under control of the image display control device, rearranging and displaying image parts divided into a plurality of parts for the designated image in response to a game start command being given, and receiving movement by a user for the rearranged image parts.

According to the present invention, in a case where a representative image is selected, an image included in a group represented by the representative image is displayed on the display screen, so that it is relatively easy to understand what kind of images are combined by viewing the displayed image.

DESCRIPTION OF THE PREFERRED EMBODIMENTS

Figure 1:
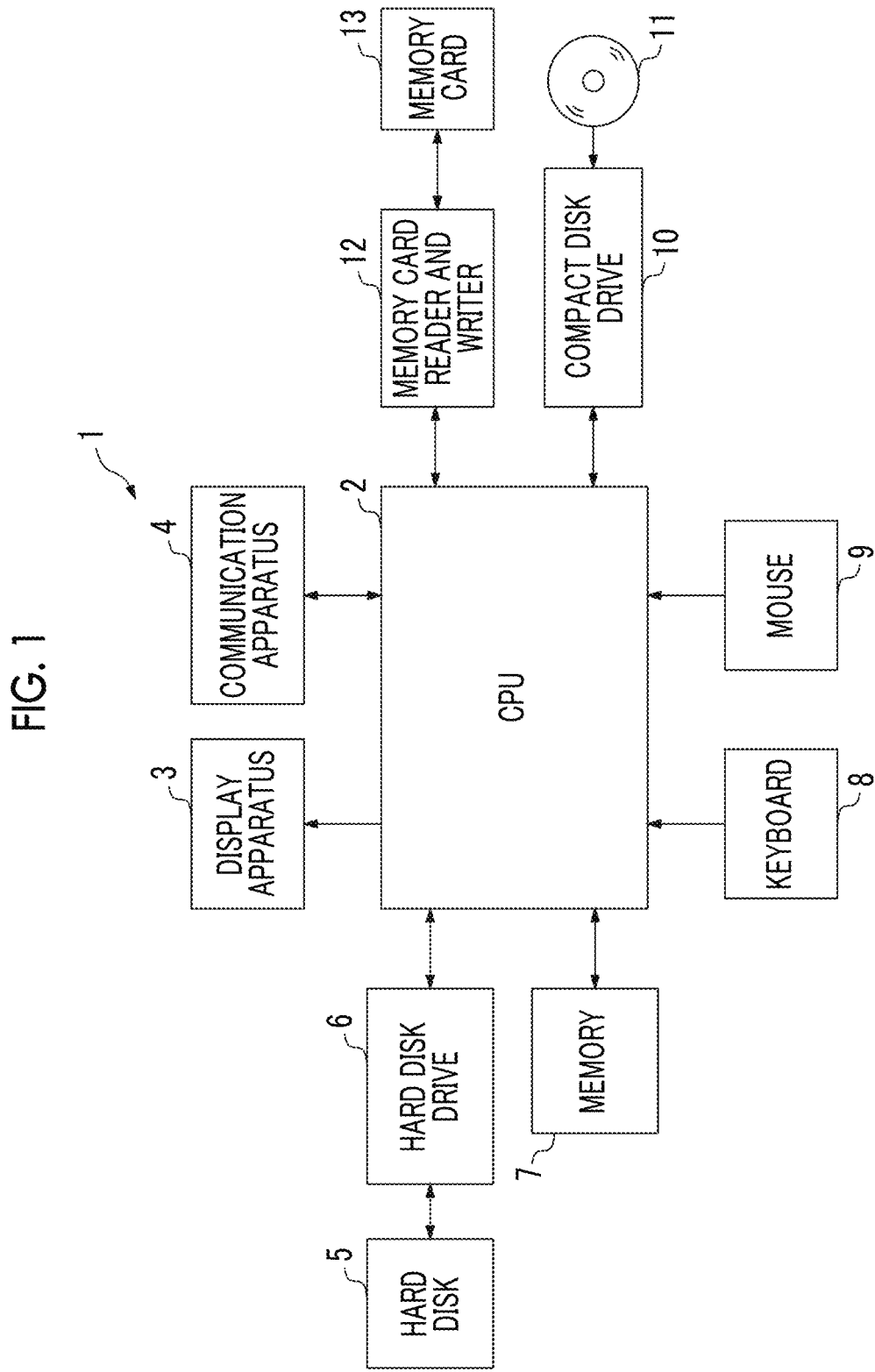
FIG. 1 is a block diagram showing an electric configuration of an image processing apparatus.

FIG. 1 shows an example of the present invention and is a block diagram showing an electrical configuration of an image processing apparatus 1.

The overall operation of the image processing apparatus 1 is integrated by a central processing unit (CPU) 2.

The image processing apparatus 1 includes a display apparatus 3 that displays images and other information on a display screen, and a communication apparatus 4 that is connected to the internet and other networks to communicate with apparatuses other than the image processing apparatus 1. In addition, the image processing apparatus 1 also includes a hard disk 5, a hard disk drive 6 for accessing the hard disk 5, a memory 7 for storing data, and the like, a keyboard 8 for inputting commands, and the like, and a mouse 9. Further, the image processing apparatus 1 also includes a compact disk drive 10 for accessing a compact disk 11 and a memory card reader and writer 12 for writing data to a memory card 13 and reading data recorded on the memory card 13.

The operation program of the image processing apparatus 1 described later is received by the communication apparatus 4 via the internet. The received operation program is installed in the image processing apparatus 1. The operation program may be received by the image processing apparatus 1 via a network such as an internet, recorded on a portable recording medium such as the compact disk 11, and read from the portable recording medium without being installed in the image processing apparatus 1. In that case, the operation program read from the portable recording medium is installed in the image processing apparatus 1. It goes without saying that the operation program can be read by the computer (CPU 2) of the image processing apparatus 1.

It is assumed that the memory 7 stores image data representing a large number of images to be classified later.

FIG. 2 to FIG. 9 are flowcharts showing processing procedures of the image processing apparatus 1.

In the image processing apparatus 1 according to this example, images are classified into groups for each similar image, and a representative image is determined for each group. The determined representative image is displayed, and in a case where the representative image is selected from the displayed representative images, the images included in the group represented by the selected representative image are displayed in a list. The images displayed in the list can be further divided into groups. In addition, the generation of an image for shuffle printing for printing a plurality of images selected on the basis of various criteria on one sheet and the execution of a puzzle game are performed.

[Example of Image Classification Processing]

Figure 10:
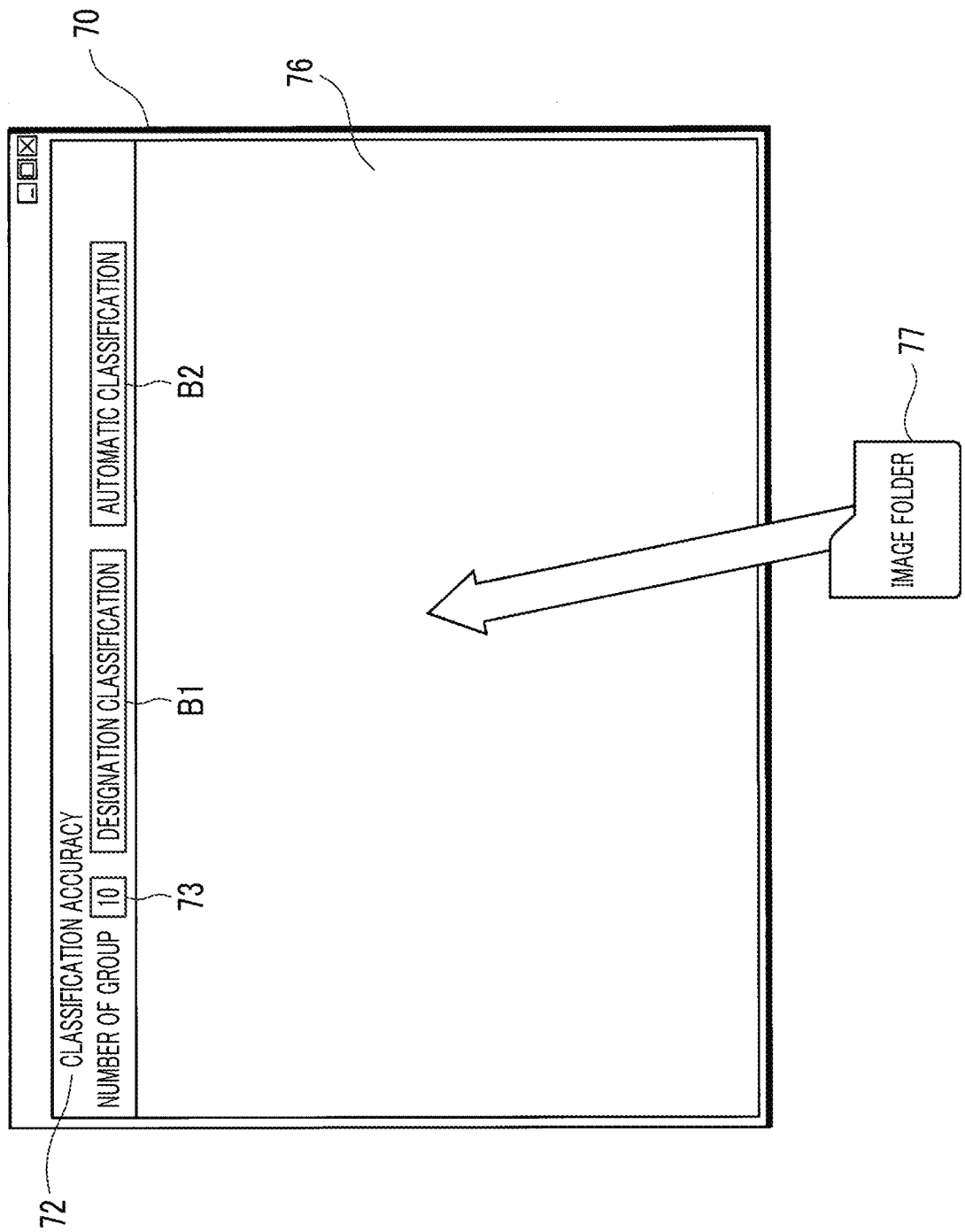
FIG. 10 is an example of a first classification window.

Referring to FIG. 10, a first classification window 70 is displayed on the display screen of display apparatus 3. In the first classification window 70, a character string 72 of "classification accuracy" is displayed in the upper left. In a case where the character string 72 of "classification accuracy" is clicked, a classification accuracy menu appears. The classification accuracy menu includes designated character strings of classification accuracy of "rough", "slightly rough", "normal", "slightly fine", and "fine", and a threshold value used for automatic classification described later by the classification accuracy menu is set by the mouse 9 (a threshold value input device).

In addition, a character string of the "number of groups" is displayed below the character string 72 of the "classification accuracy" in the first classification window 70, and a group number input window 73 is formed on the right side of the character string of "number of groups". The group number input window 73 is selected by using the mouse 9, and the group number is input by using the keyboard 8 (a group number input device). On the right side of the group number input window 73, a first designation classification button B1 in which a character string of "designation classification" is formed and a first automatic classification button B2 (an automatic classification command input device) in which a character string of "automatic classification" is formed are formed. In a case where the first designation classification button B1 is pressed, the images are classified into groups having the number of groups input in the group number input window 73. In a case where the first automatic classification button B2 is pressed, the images are classified into groups having the number of groups determined on the basis of a predetermined image classification program.

Figure 2:
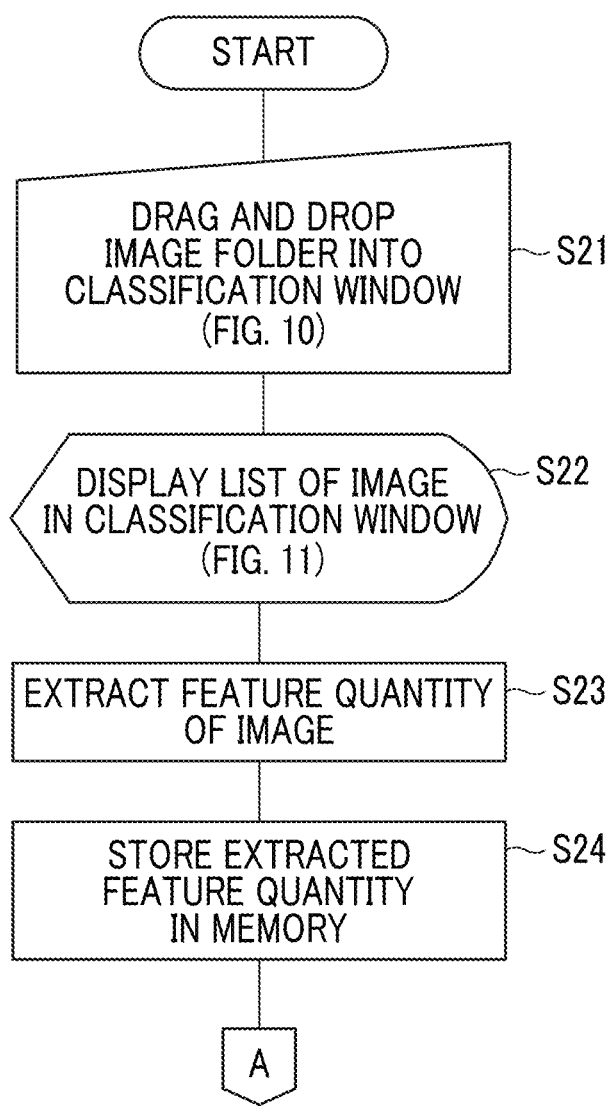
FIG. 2 is a flowchart showing a processing procedure of an image processing apparatus.

The user drags and drops an image folder 77 storing a plurality of images to be classified into a display region 76 of the first classification window 70 (step S21 in FIG. 2). Instead of dragging and dropping the image folder 77 to the first classification window 70, a plurality of images to be classified may be dragged and dropped to the first classification window 70. In a case where the image folder 77 is dragged and dropped into the first classification window 70, images (thumbnail images) stored in the image folder 77 are displayed in a list in the display region 76 (step S22 in FIG. 2).

Figure 11:
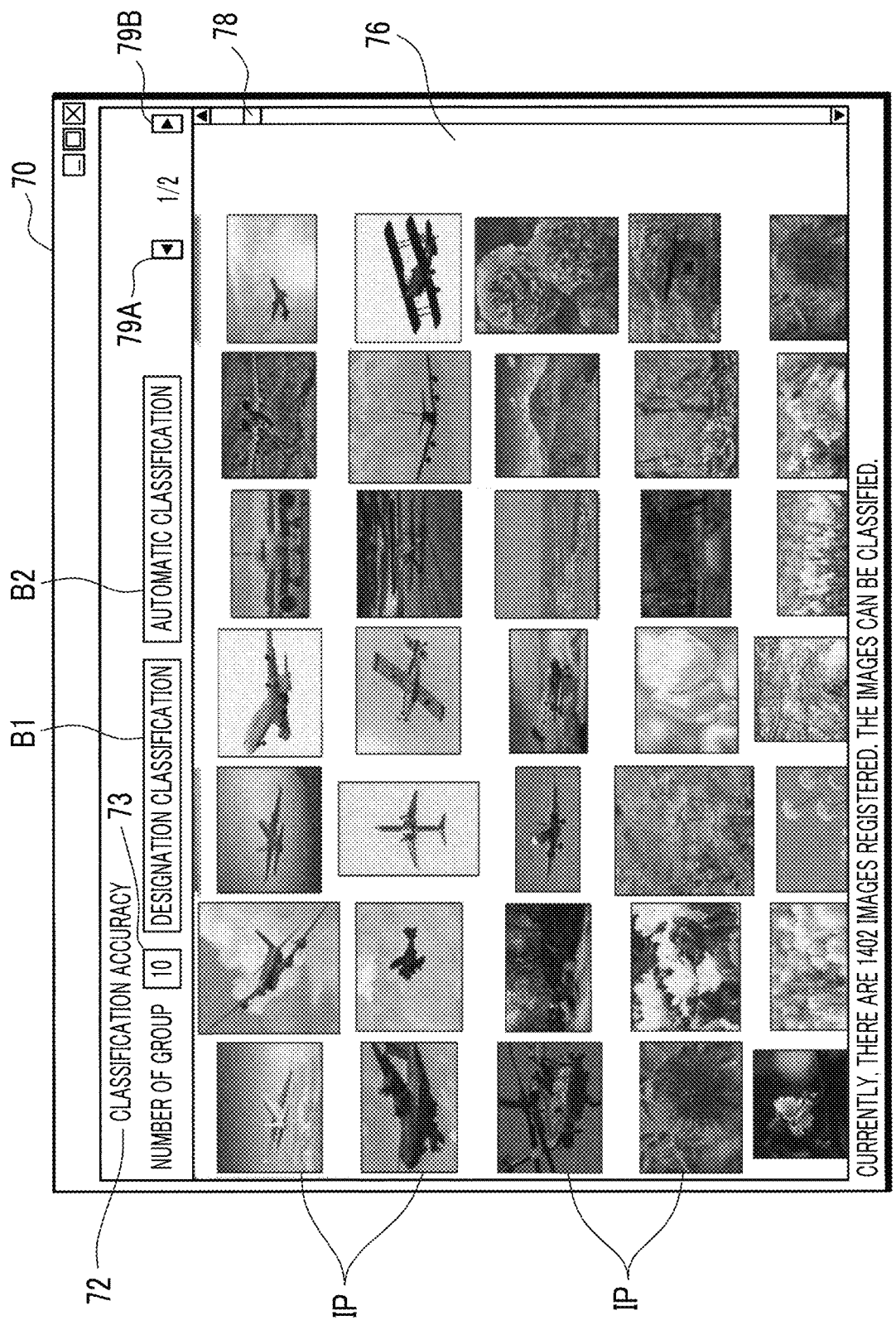
FIG. 11 is an example of a first classification window.

FIG. 11 is an example of the first classification window 70 in which images are displayed in a list in the display region 76.

Images (thumbnail images) IP stored in the image folder 77 are displayed in a list in the display region 76 of the first classification window 70. In a case where the number of images stored in the image folder 77 is large and all of the images cannot be displayed in the display region 76, a vertically movable knob 78 is formed at the right end of the first classification window 70. An image that is not displayed in the display region 76 is displayed in the display region 76 by vertically moving the knob 78.

Further, in the first classification window 70 shown in FIG. 11, a left button 79A and a right button 79B for page movement and the number of pages appear in the upper right portion. The left button 79A, the right button 79B and the number of pages are used not only for changing an image displayed in the display region 76 by vertically moving the knob 78 in a case where the number of images to be displayed in the display region 76 is large, but also for switching an image displayed in the display region 76 by switching pages on the assumption that the display region 76 is a page. For example, the first half image (for example, images in the first half in file number order and imaging order) of the plurality of images included in the image folder 77 is first displayed in the display region 76, and in a case where the right button 79B is pressed, the second half image (for example, images in the second half in file number order and imaging order) of the plurality of images included in the image folder 77 is displayed in the display region 76. In a case where the left button 79A is pressed while the second half image is displayed in the display region 76, the first half image is displayed in the display region 76.

A feature quantity of the image to be classified displayed in the display region 76 of the first classification window 70 is extracted by the CPU 2 (step S23 in FIG. 2). The feature quantity may be an image resolution, an amount of data, a degree of out-of-focus, a type of the main subject, a size of the main subject relative to the image, a position of the main subject, a tint, and the like. In addition, the feature quantity may be generated by combining a plurality of the above. Further, the feature quantity may be configured by a plurality of parameters that a learned model previously learned by supervised learning or unsupervised learning receives input of an image and outputs the image. Here, the feature quantity output from the learned model may not be interpreted by a human being in some cases, but it can be used as the feature quantity of the present invention as long as it is a numerical group which is uniquely output in a case where one image is input. The feature quantity is information necessary for deciding whether or not it is suitable as images (images extracted from a plurality of images) used for the album or an arrangement position of the album, and the like. A plurality of types of feature quantities to be extracted are preferable, but one feature quantity may be used. The extracted feature quantity is associated with the ID for identifying the image and temporarily stored in the memory 7 (step S24 in FIG. 2).

In a case Where the user determines the number of groups and classifies images (images stored in the image folder 77) displayed in the display region 76 of the first classification window 70 into the group of the determined number of groups, the user inputs the desired number of groups in the group number input window 73 and presses the first designation classification button B1 (click). In a case where the user does not input the number of groups and automatically classifies images (images stored in the image folder 77) displayed in the display region 76 of the first classification window 70, the user presses the first automatic classification button B2.

Figure 3:
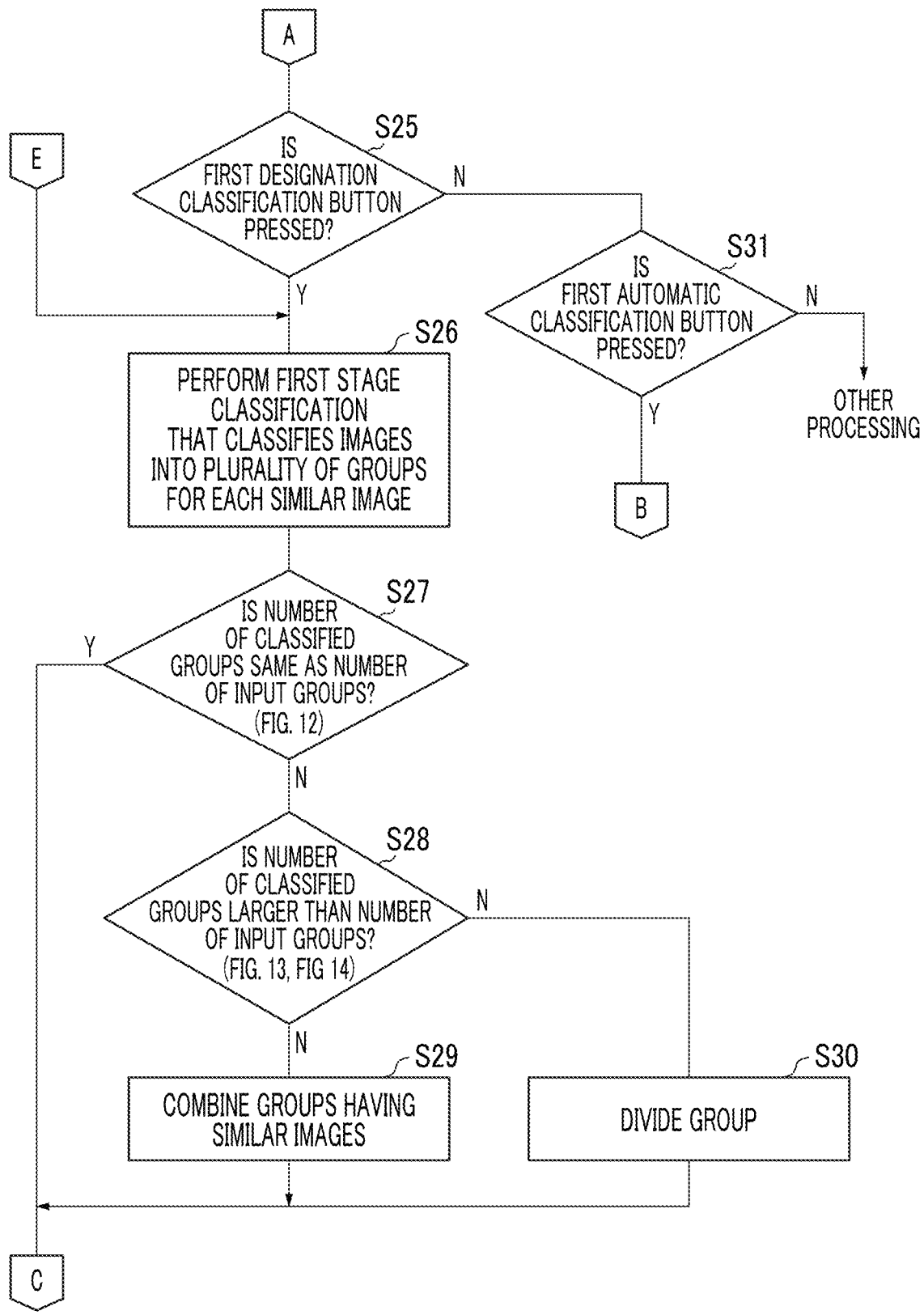
FIG. 3 is a flowchart showing a processing procedure of an image processing apparatus.

In a case where the first designation classification button B1 is pressed (YES in step S25 of FIG. 3), the CPU 2 (an image classification device) performs the first stage classification that classifies the images to be classified into a plurality of groups for each image similar to each other (FIG. 3 step S26).

Figure 12:
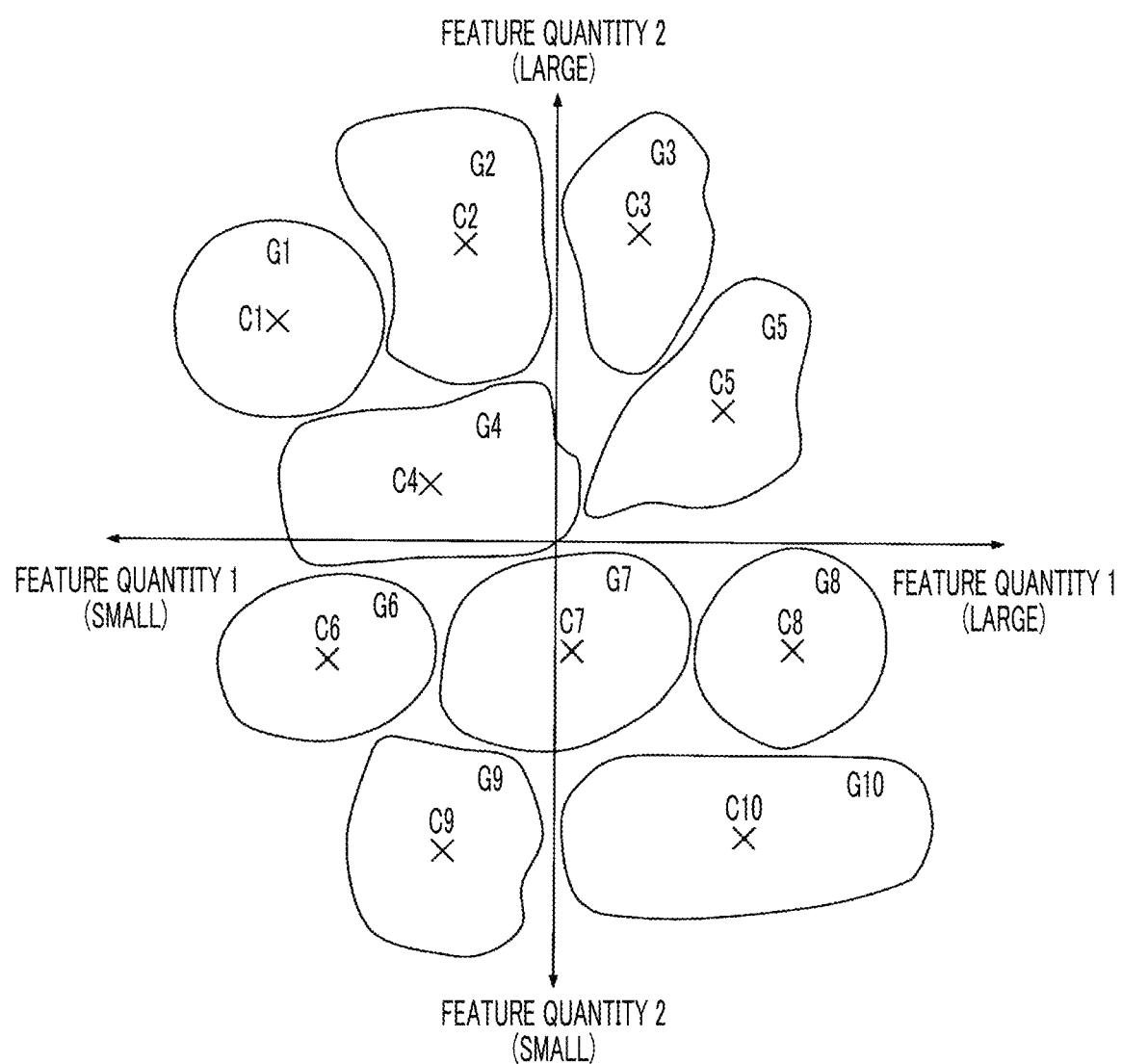
FIG. 12 shows how images are divided into groups.

FIG. 12 shows a feature quantity space represented by two feature quantity coordinate axes, and shows a state in which the feature quantity space is classified into a plurality of groups by the first stage classification.

In FIG. 12, the lateral axis represents the first feature quantity, the vertical axis represents the second feature quantity, and FIG. 12 shows a state in which a plurality of images are classified into groups by the two feature quantities. Needless to say, three or more feature quantities may be used instead of two. In FIG. 12, a plurality of images to be classified are divided by the CPU 2 into 10 groups from group G1 to group G10. This grouping can be realized, for example, by using the k-means method. The images are classified in each of the groups G1 to G10 according to the feature quantity. In a case where the number of groups input to the group number input window 73 is 10, in the case shown in FIG. 12, since the number of classified groups is the same as the number of input groups (YES in step S27 of FIG. 3), it means that the image is classified into the number of groups desired by the user. Therefore, the centroid of each group is calculated, and the process shifts to the processing of determining the representative image started from the processing shown in FIG. 5.

Figure 13:
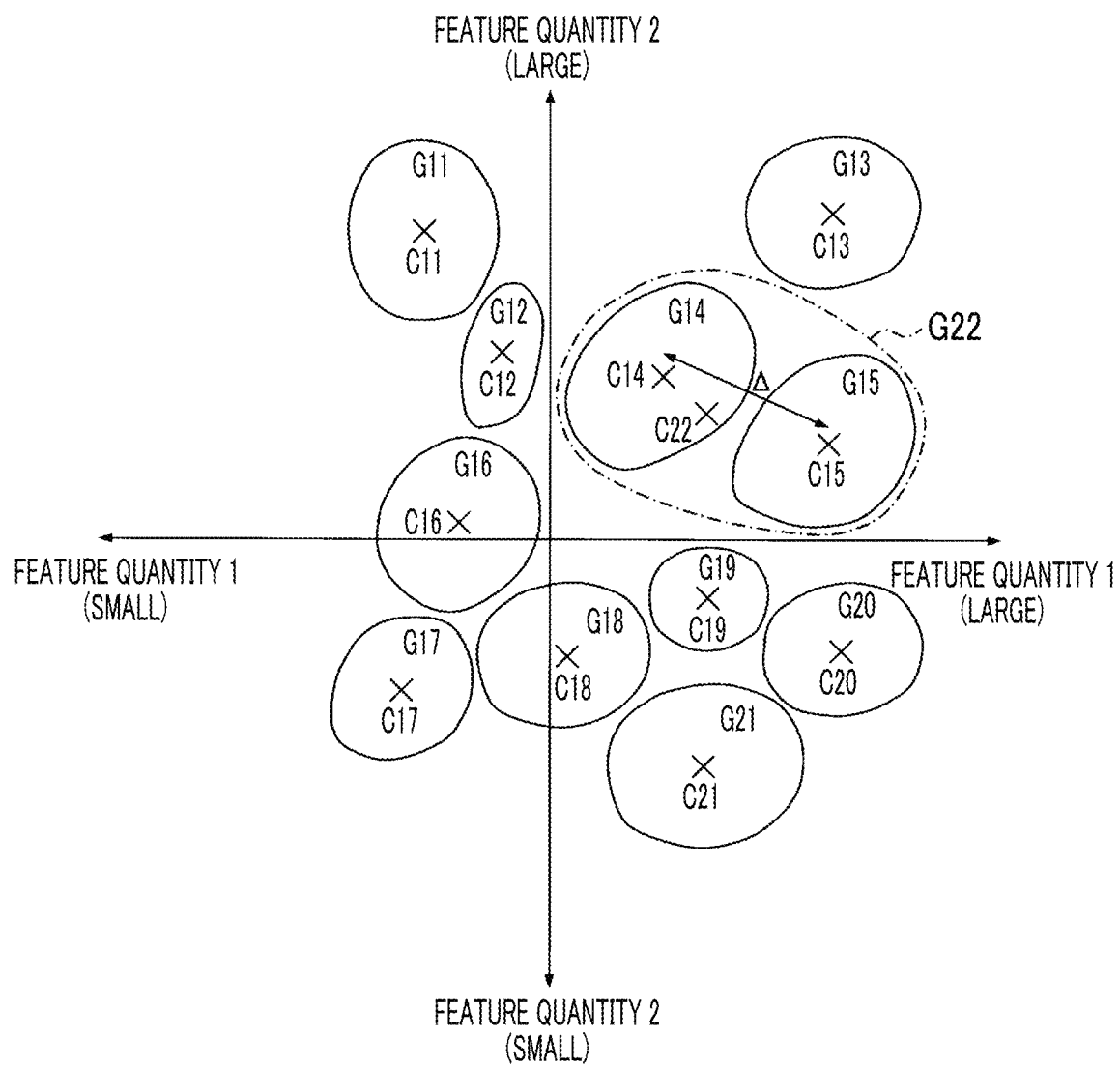
FIG. 13 shows how images are divided into groups.

FIG. 13 also shows the feature quantity space, and shows a state in which the feature quantity space is divided into a plurality of groups by the first stage classification.

In FIG. 13, it is assumed that, although the number of groups input in the group number input window 73 is 10, the group is divided into 11 groups from group G11 to group G21 by the first stage classification, Since the number of classified groups does not become the same as the number of input groups (NO in step S27 of FIG. 3) and the number of classified groups becomes larger than the number of input groups (YES in step S28 of FIG. 3), the CPU 2 performs a second stage processing that combines groups having similar images included in the groups among the groups obtained by the first stage classification so as to become the number of input groups (step S29 of FIG. 3). In this way, in a case where the number of groups obtained by the first stage classification is larger than the number of groups input from the group number input window 73, the CPU 2 performs the second stage classification that combines the groups so as to be the same as the number of input groups.

In the feature quantity space shown in FIG. 13, the centroids of the images included in the group are calculated for each group, and groups whose calculated centroids are closest to each other can be combined as groups whose images included in the group are similar to each other. For example, in a case where the centroid of group G14 is C14 and the centroid of group G15 is C15, and the distance A between the centroid C14 and the centroid C15 is shorter than the distance between the other centroids, group G14 with the centroid C14 and group G15 with the centroid C15 are combined into a new group G22 with a new centroid C22. Since the number of groups is the same as the number of input groups, the process shifts to the processing of determining the representative image started from the processing shown in FIG. 5.

Figure 14:
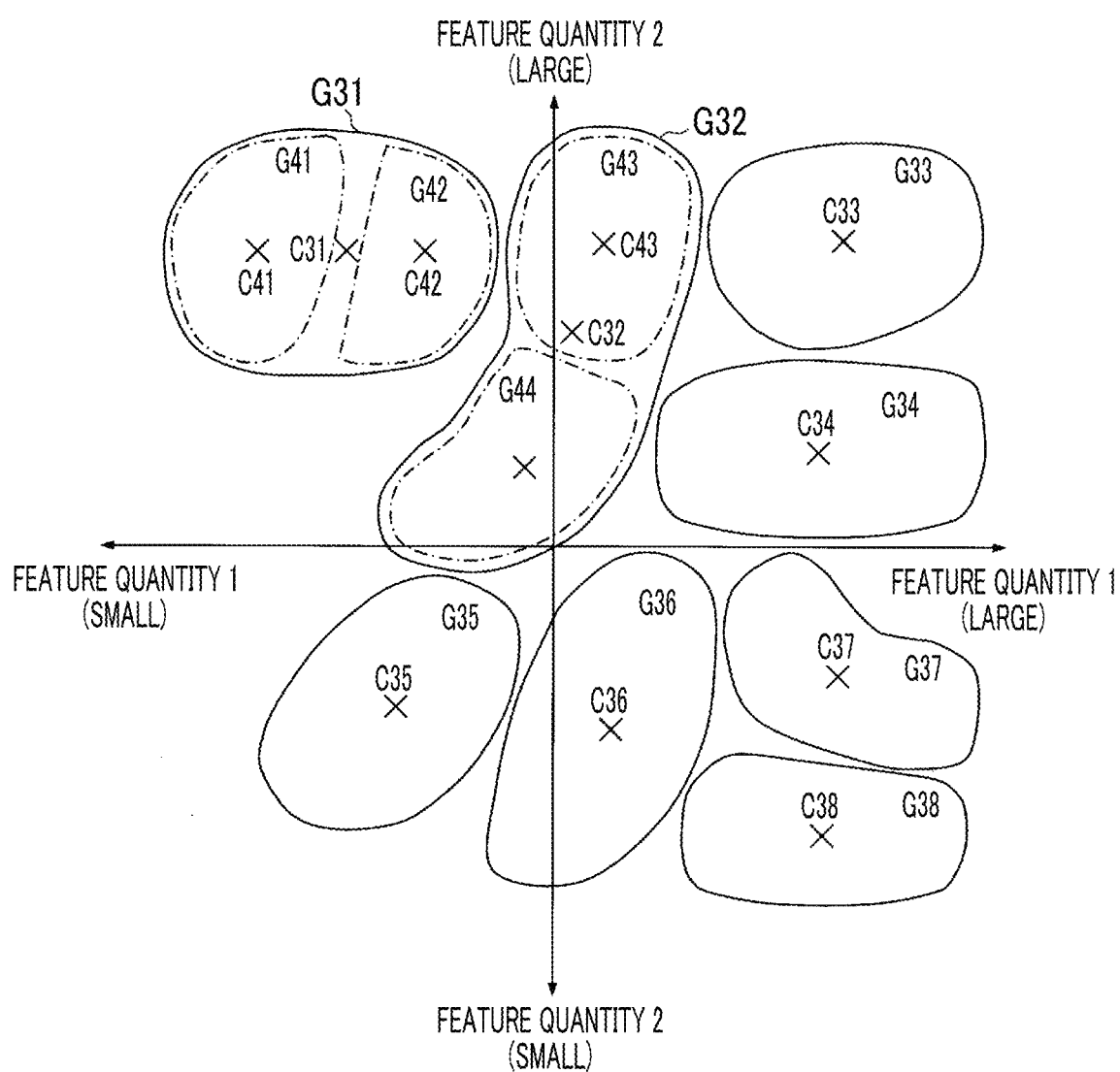
FIG. 14 shows how images are divided into groups.

FIG. 14 also shows the feature quantity space, and shows a state in which the feature quantity space is divided into a plurality of groups by the first stage classification.

In FIG. 14, it is assumed that, although the number of groups input in the group number input window 73 is 10, the group is divided into 8 groups from group G31 to group G38 by the first stage classification. Since the number of classified groups does not become the same as the number of input groups (NO in step S27 of FIG. 3) and the number of classified groups becomes smaller than the number of input groups (NO in step S28 of FIG. 3), the CPU 2 performs the second stage processing that divides the images in the group obtained by the first stage classification to create a new group so as to become the number of input groups (step S30 of FIG. 3). In this way, in a case where the number of groups obtained by the first stage classification is smaller than the number of groups input from the group number input window 73, the CPU 2 performs the second stage classification that divides the groups so as to be the same as the number of input groups.

In the feature quantity space system shown in FIG. 14, a group having a large number of images and a group having a wide image distribution range can be divided into groups. For example, the group G31 is divided into a group G41 and a group G42, and the group G32 is divided into a group G43 and a group G44. As a result, 10 groups G33 to G38 and G41 to G44, which are the same as the number of input groups, are generated. Instead of dividing one group into two, it may be divided into three or more. Since the number of groups is the same as the number of input groups, the process shifts to the processing of determining the representative image started from the processing shown in FIG. 5.

Figure 4:
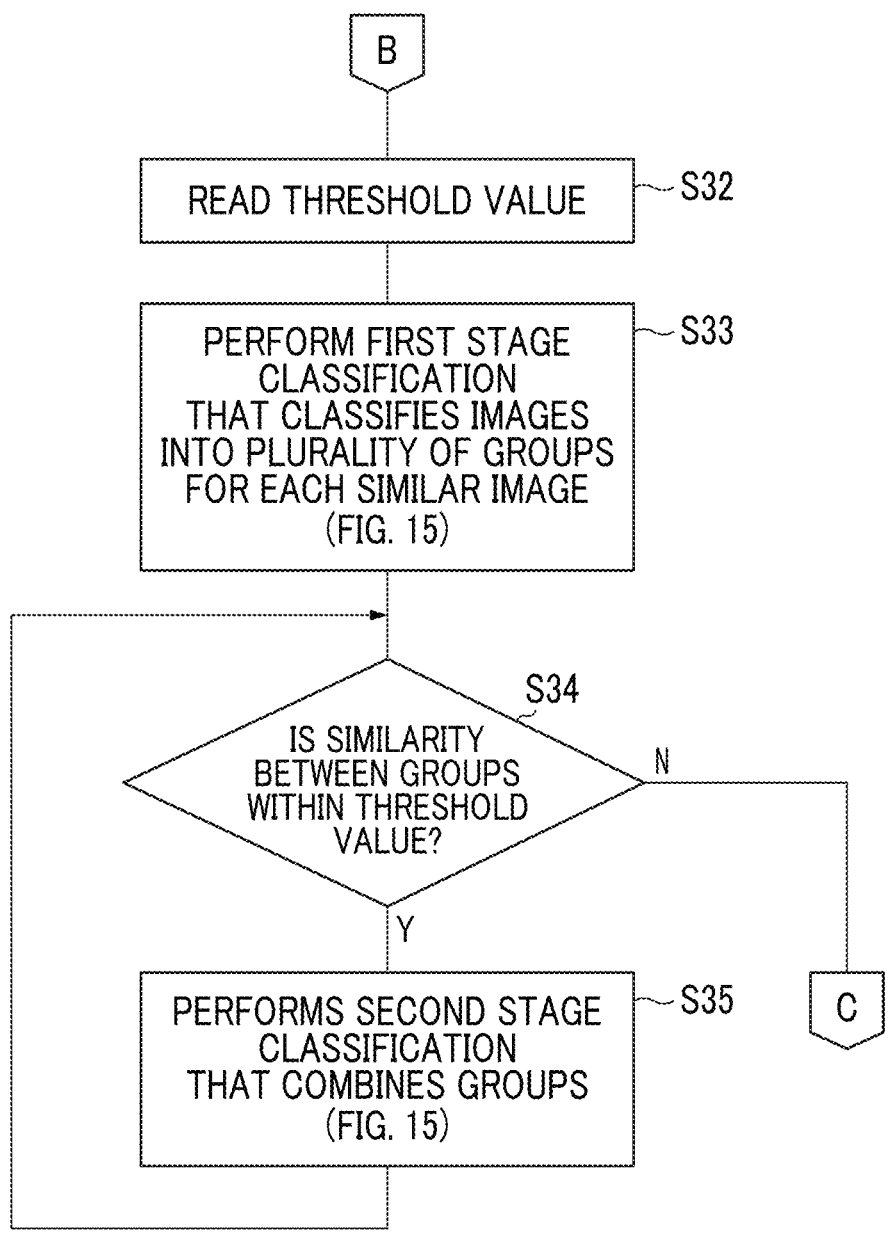
FIG. 4 is a flowchart showing a processing procedure of an image processing apparatus.

In a case where the first automatic classification button B2 is pressed (YES in step S31 of FIG. 3) without pressing the first designation classification button B1 (NO in step S25 of FIG. 3), an automatic classification command is generated, and a threshold value selected by using the classification accuracy menu appearing by, clicking the character string 72 of classification accuracy is read (step S32 in FIG. 4). Subsequently, the CPU 2 performs the first classification that classifies a plurality of images to be classified into a plurality of groups for each similar image (step S33 in FIG. 4).

Figure 15:
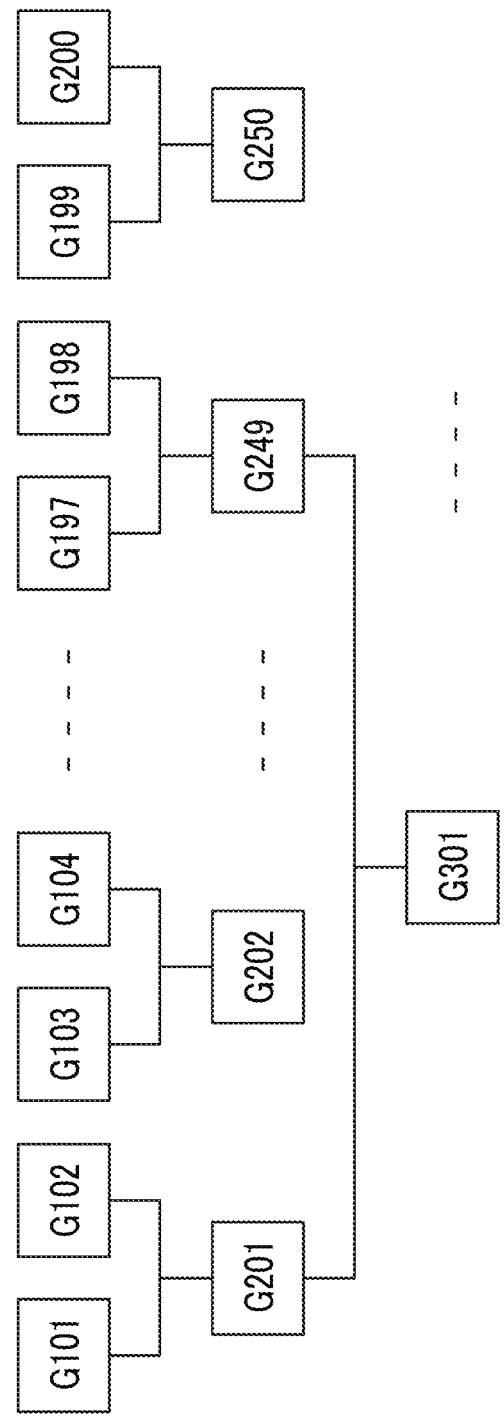
FIG. 15 shows how images are divided into groups.

FIG. 15 shows how the images are classified into a plurality of groups.

In the example shown in FIG. 15, images are classified into 100 groups from group G101 to group G200 in the first stage classification, for example, using the k-means method. Similar images are included in each of the 100 groups from group G101 to group G200. In a case where the first automatic classification button B2 is pressed, in the first stage classification, a relatively large number of groups are classified.

Subsequently, the CPU 2 determines whether or not the similarity between groups is within the read threshold value (step S34 in FIG. 4), and the CPU 2 performs the second stage classification that combines the groups within the threshold value (step S35 in FIG. 4). For example, in a case where the similarity between the group G101 and the group G102 is within the threshold value, the group G101 and the group G102 are combined to generate a new group G201. Similarly, in a case where the similarity between the group G103 and the group G104 is within the threshold value, the group G103 and the group G104 are combined to generate a new group G202. Similarly, the group G197 and the group G198 are combined to generate a new group G249, and the group G199 and the group G200 are combined to generate a new group G250. Newly generated groups are also combined n a case where the similarity between the groups is within a threshold value. For example, the group G201 and the group G249 are combined to generate a new group G301. The threshold value becomes small in the order of "rough", "slightly rough", "normal", "slightly fine", "fine" in the setting of the classification accuracy menu. The number of generated groups is the smallest in a case where "rough" is set, and increases in the order of "slightly rough", "normal", "slightly fine", and "fine".

Figure 5:
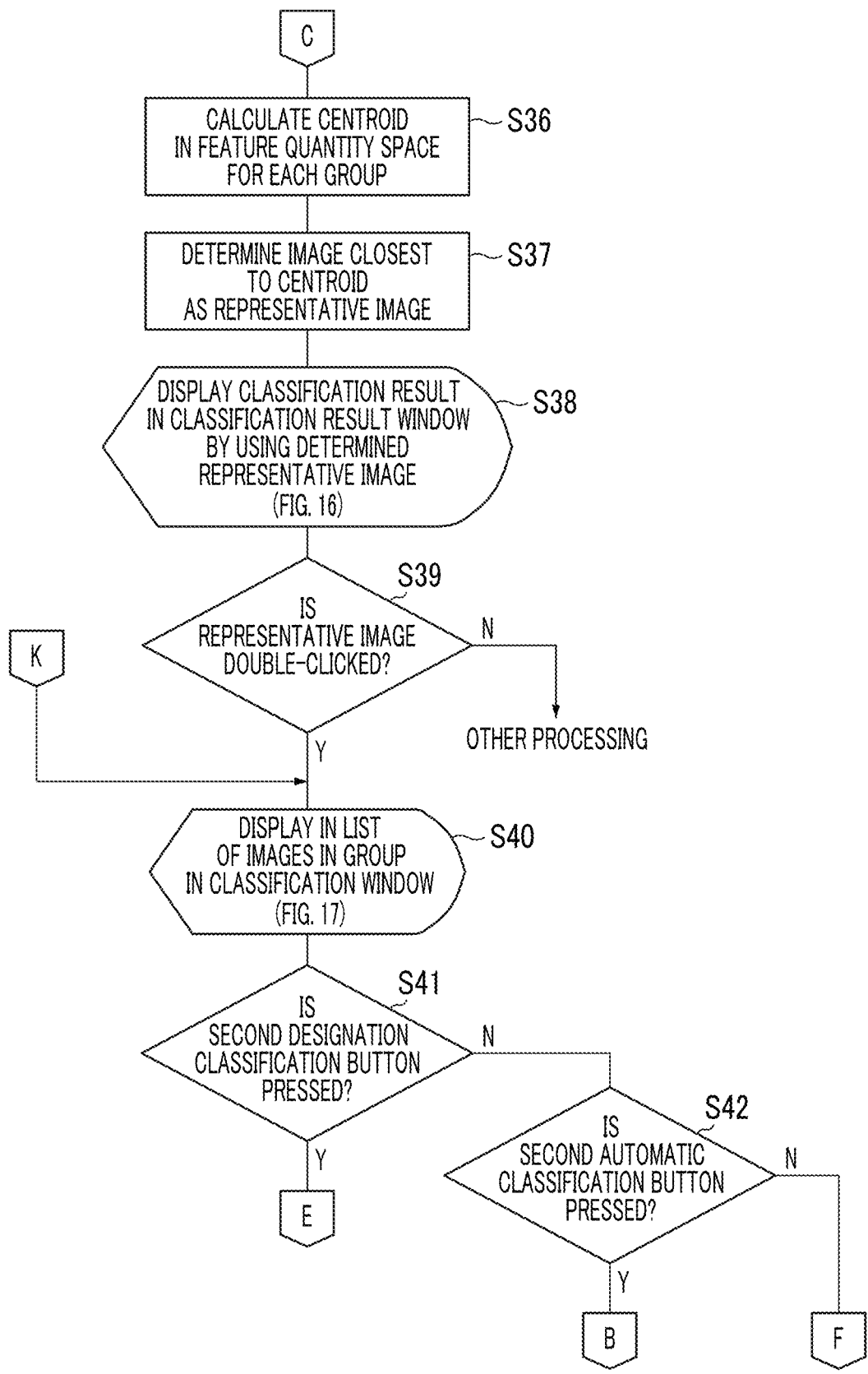
FIG. 5 is a flowchart showing a processing procedure of an image processing apparatus.

In a case where the similarity between the groups is not within the threshold value (YES in step S34 of FIG. 4), the second stage classification is ended, and the process shifts to the processing of determining the representative image started from the processing shown in FIG. 5.

Referring to FIG. 5, in the processing of determining the representative image, the centroid in the feature quantity space is calculated for each group determined as described above (step S36 in FIG. 5).

For example, as shown in FIG. 12, it is assumed that a plurality of images to be classified are classified into 10 groups from the group G1 of the number of groups designated by the user to the group G10 for each similar image. Then, in each of the 10 groups from the group G1 to the group G10, the centroid (centroid of the image in the feature quantity space) of the images included in each group is calculated by the CPU 2. The respective centroids C1 to C10 of the groups G1 to G10 are obtained. Also in the case shown in FIG. 13, the CPU 2 calculates the centroid C11 to the centroid C13, the centroid C16 to the centroid C21, and the centroid C22 of each of the group G11 to group G13, the group G16 to group G21, and the group G22. In the case shown in FIG. 14, similarly, the CPU 2 calculates the centroid C33 to the centroid C38 and the centroid C41 to the centroid C44 of each of the group G33 to group G38 and the group G41 to group G44. Further, even in a case where groups are classified by automatic classification as shown in FIG. 15, the centroid is calculated by the CPU 2 for each group.

In a case where the centroid is determined, the image closest to the determined centroid (image distributed at the closest position) is determined by the CPU 2 as a representative image of the group having the centroid (step S37 in FIG. 5). In a case where the representative image is determined, the image classification result is displayed in the classification result window by using the determined representative image (step S38 in FIG. 5). This classification result window is displayed on the display screen of the display apparatus 3.

Figure 16:
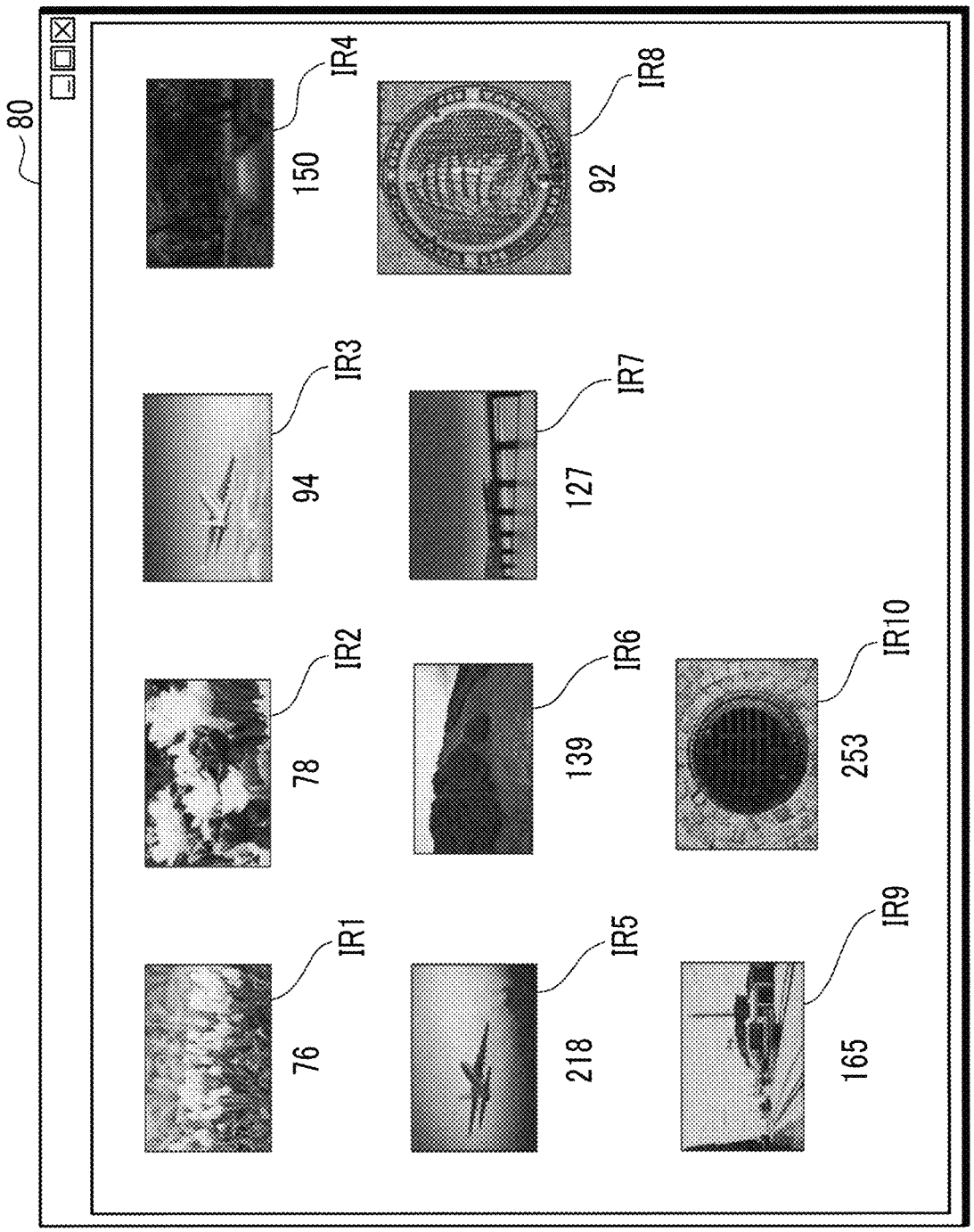
FIG. 16 is an example of a classification result display window.

FIG. 16 is an example of a classification result display window 80.

In the classification result display window 80, representative images IR1 to IR10 of each group classified into 10 groups are displayed under the control of the CPU 2 (a representative image display control device). For example, each of the representative images IR1 to IR10 is an image representing each of the groups G1 to G10 shown in FIG. 12. Each of the representative images IR1 to IR10 is the image closest to the centroid C1 to the centroid C10 of each of the groups G1 to G10 shown in FIG. 12.

The number of images included in the group represented by the representative image is displayed at the lower portion of each of the representative images IR1 to IR10. The images included in the group represented by the representative image are images having feature quantities that are similar to each other in the feature quantity space shown in FIG. 12.

In a case where any one of the representative image IR1 to the representative image IR10 displayed in the classification result display window 80 is double-clicked (any device other than the mouse 9 may be used as long as it can select an image, such as touching the touch panel display) by the mouse 9 (a representative image selection device) (YES in step S39 of FIG. 5), the double-clicked representative image is selected. Images included in the group represented by the selected representative image (images similar to each other) are displayed in a list in the second classification window 70A (step S40 in FIG. 5).

Figure 17:
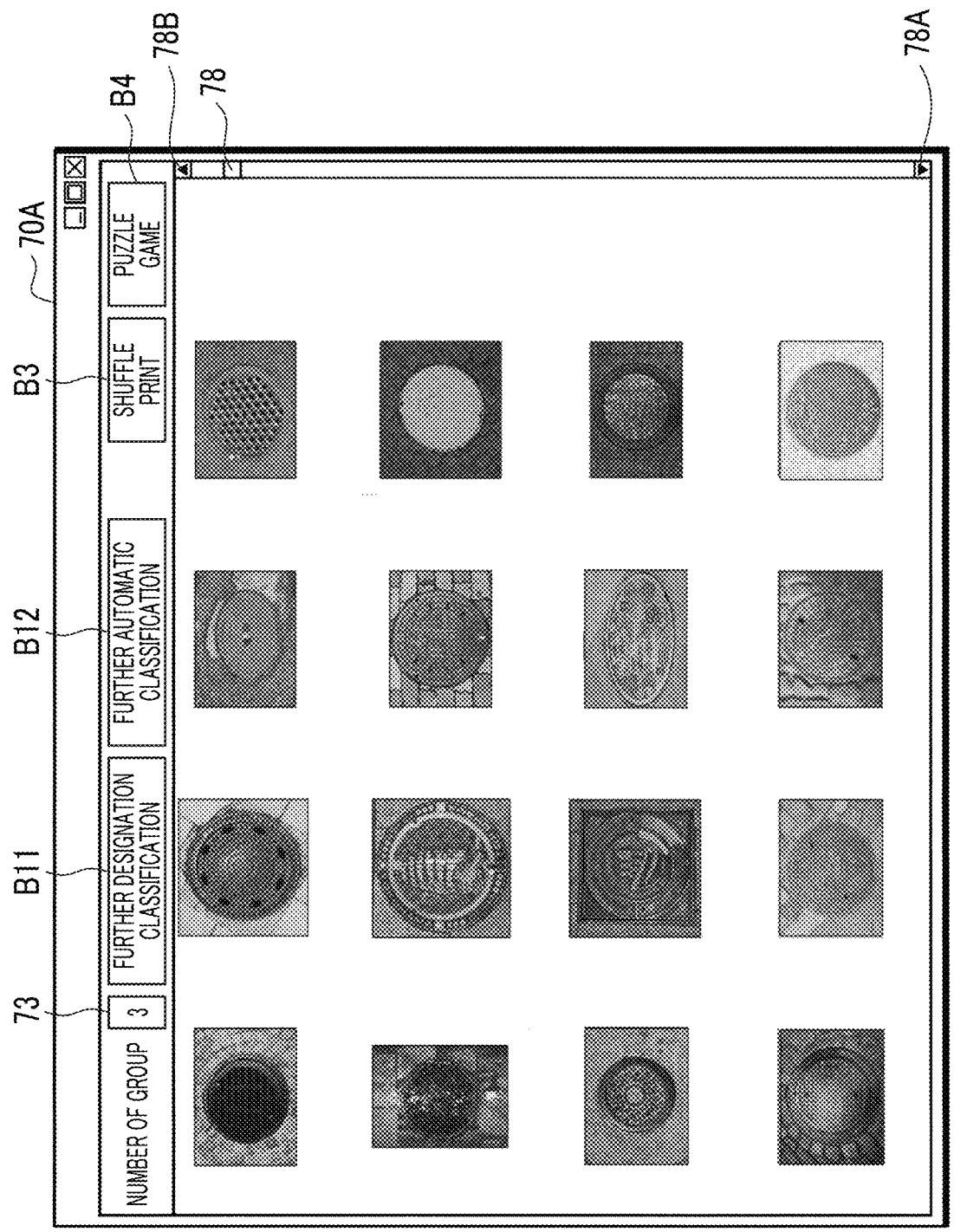
FIG. 17 is an example of a second classification window.

FIG. 17 shows an example of the second classification window 70A in a case where the representative image IR10

(manhole cover image) is selected from among the representative image IR1 to the representative image IR10 displayed in the classification result display window 80.

The second classification window 70A is also displayed on the display screen of the display apparatus 3. In the second classification window 70A, the same components as those in the first classification window 70 are designated by the same reference numerals and the description thereof will be omitted. In the second classification window 70A, unlike the first classification window 70, a second designation classification button B11 displaying a character string of "further designation classification" and a second automatic classification button B12 displaying a character string of "more automatic classification" are formed at the upper left portion. In addition, a shuffle print button B3 displaying a character string of "shuffle print" and a puzzle game button B4 displaying a character string of "puzzle game" are formed at the upper right portion of the second classification window 70A.

In this example, it is assumed that the representative image IR10 among the representative image IR1 to the representative image IR10 displayed in the classification result display window 80 shown in FIG. 16 is double-clicked (selected) by the user. Then, the images included in the group represented by the representative image IR10 are displayed in the second classification window 70A as a list of CPU 2 (a similar image display control device) (step S40 in FIG. 5). Since the images displayed in the second classification window 70A are images classified into the same group, they are similar to each other. The user can view an image similar to the representative image IR10 by double-clicking on the representative image IR10. It is relatively easy to understand what kind of images are combined. Similarly, in a case where a representative image other than the representative image IR10 is double-clicked, an image similar to the double-clicked representative image can be viewed, and it is possible to understand what kind of images are combined. In a case where there is an image that the user thinks should not be included in the same group among the displayed images, the image is deleted. Data indicating deletion is recorded in an image header corresponding to the image data representing the deleted image, and is classified into another group in the next classification.

In a case where the second designation classification button B11 is pressed (YES in step S41 of FIG. 5), a classification command is generated and input to the CPU 2. The image displayed in the second classification window 70A becomes an image to be newly classified, and the CPU 2 (an image classification device) performs the first stage classification that classifies the images into a plurality of groups for each similar image (step S26 in FIG. 3). The similar images displayed in the second classification window 70A are further classified into groups having the number of groups input in the group number input window 73 for each more similar image. It goes without saying that the number of groups desired by the user is input to the group number input window 73 by the user. However, in a case where the default number of groups is input to the group number input window 73, and the number of groups is not input by the user, the group is classified into the group of the default number of groups.

In a case where the second automatic classification button B12 is pressed (NO in step S41 of FIG. 5, YES in step S42 of FIG. 5), a classification command is generated and input to the CPU 2. The image displayed in the second classification window 70A becomes an image to be newly classified, the threshold value of the similarity is input (step S32 in FIG. 4), and the CPU 2 (an image classification device) performs the first stage classification that classifies the images into a plurality of groups for each similar image (step S33 in FIG. 4). The similar images displayed in the second classification window 70A are further automatically classified into groups for each more similar image.

[Example of Shuffle Processing]

Figure 6:
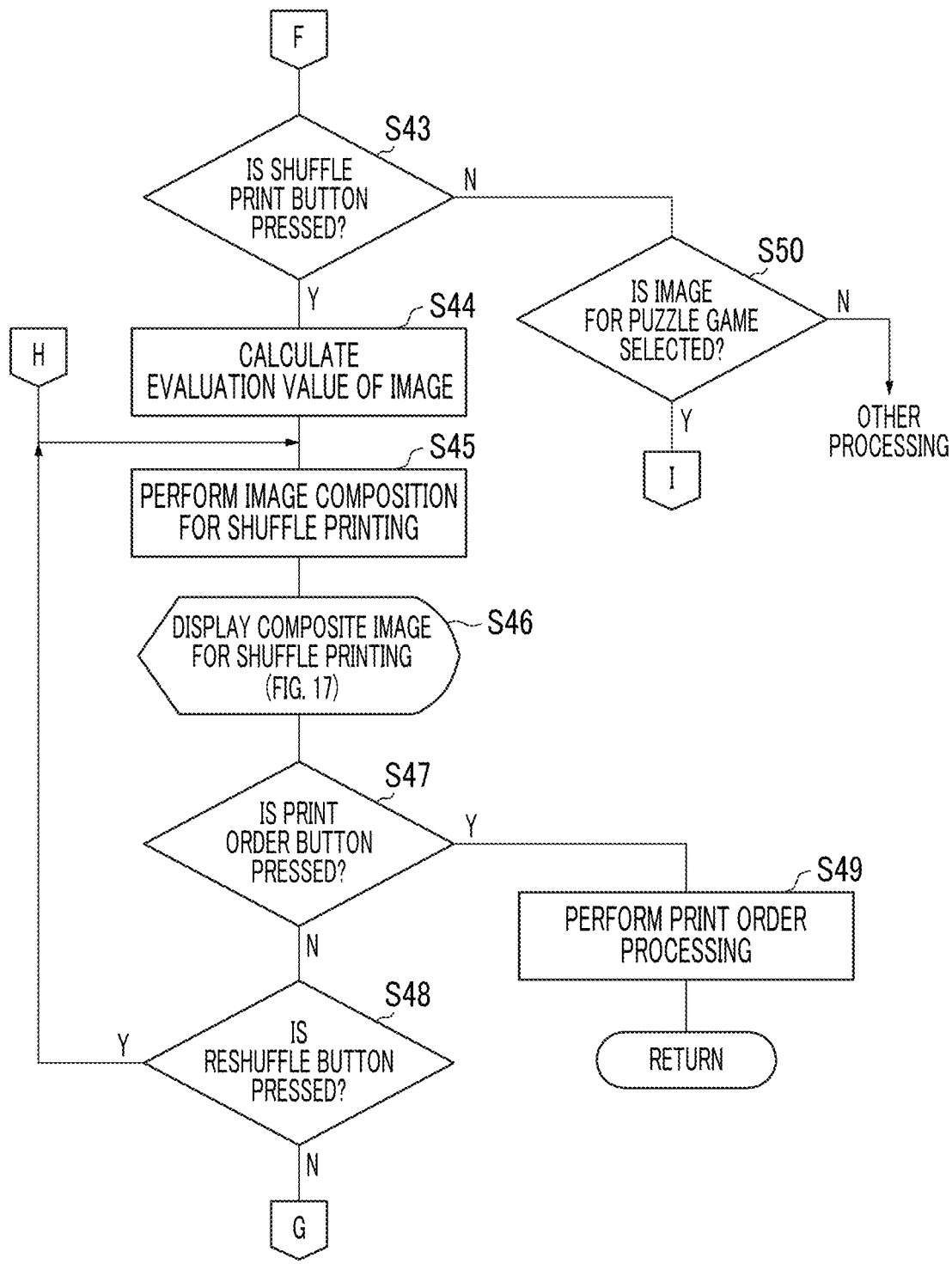
FIG. 6 is a flowchart showing a processing procedure of an image processing apparatus.
Figure 7:
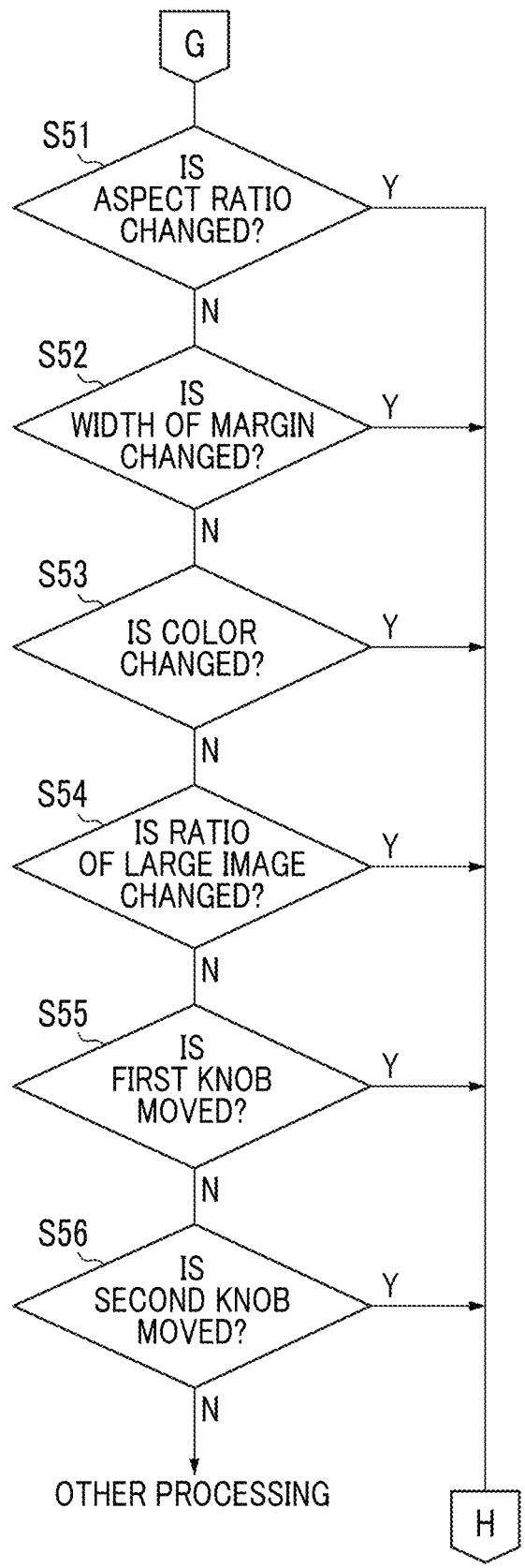
FIG. 7 is a flowchart showing a processing procedure of an image processing apparatus.
Figure 8:
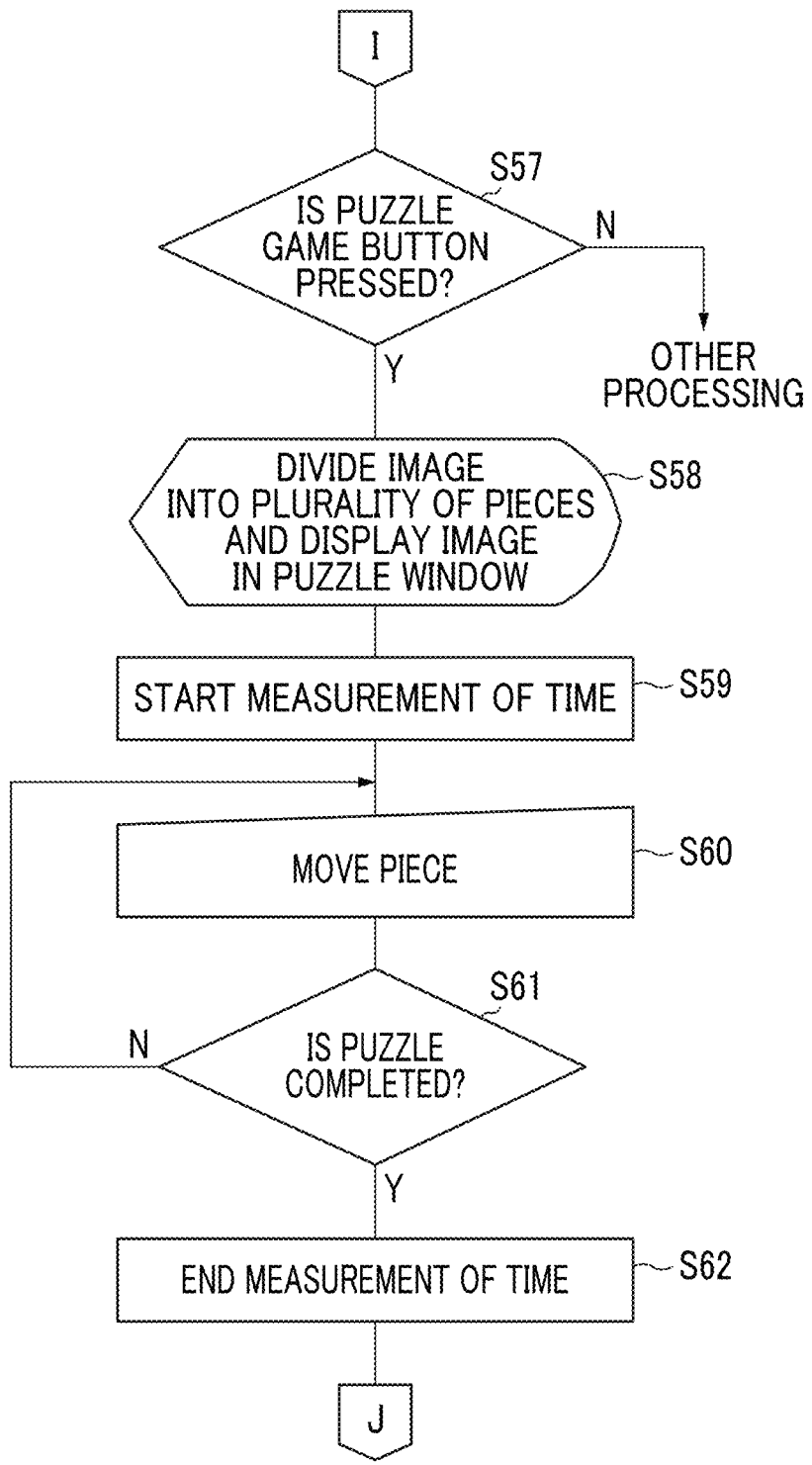
FIG. 8 is a flowchart showing a processing procedure of an image processing apparatus.

In a case where the shuffle print button B3 (a list display command input device) is pressed (NO in step S42 of FIG. 5, and YES in step S43 of FIG. 6), a shuffle print command (list display command) is generated, and an evaluation value of a similar image displayed in the second classification window 70A is calculated by the CPU 2 (an evaluation value calculation device) (step S44 in FIG. 6). The evaluation value of the image may be calculated before the shuffle print button B3 is pressed. The image evaluation value is, for example, a numerical value of the sharpness of the image, the position, size, and brightness of the main subject with respect to the image.

Similar images displayed in the second classification window 70A perform image composition by the CPU 2 for shuffle printing (step S45 in FIG. 6). In this image composition, the CPU 2 generates a composite image such that an image having a high evaluation value is larger than other images.

Figure 18:
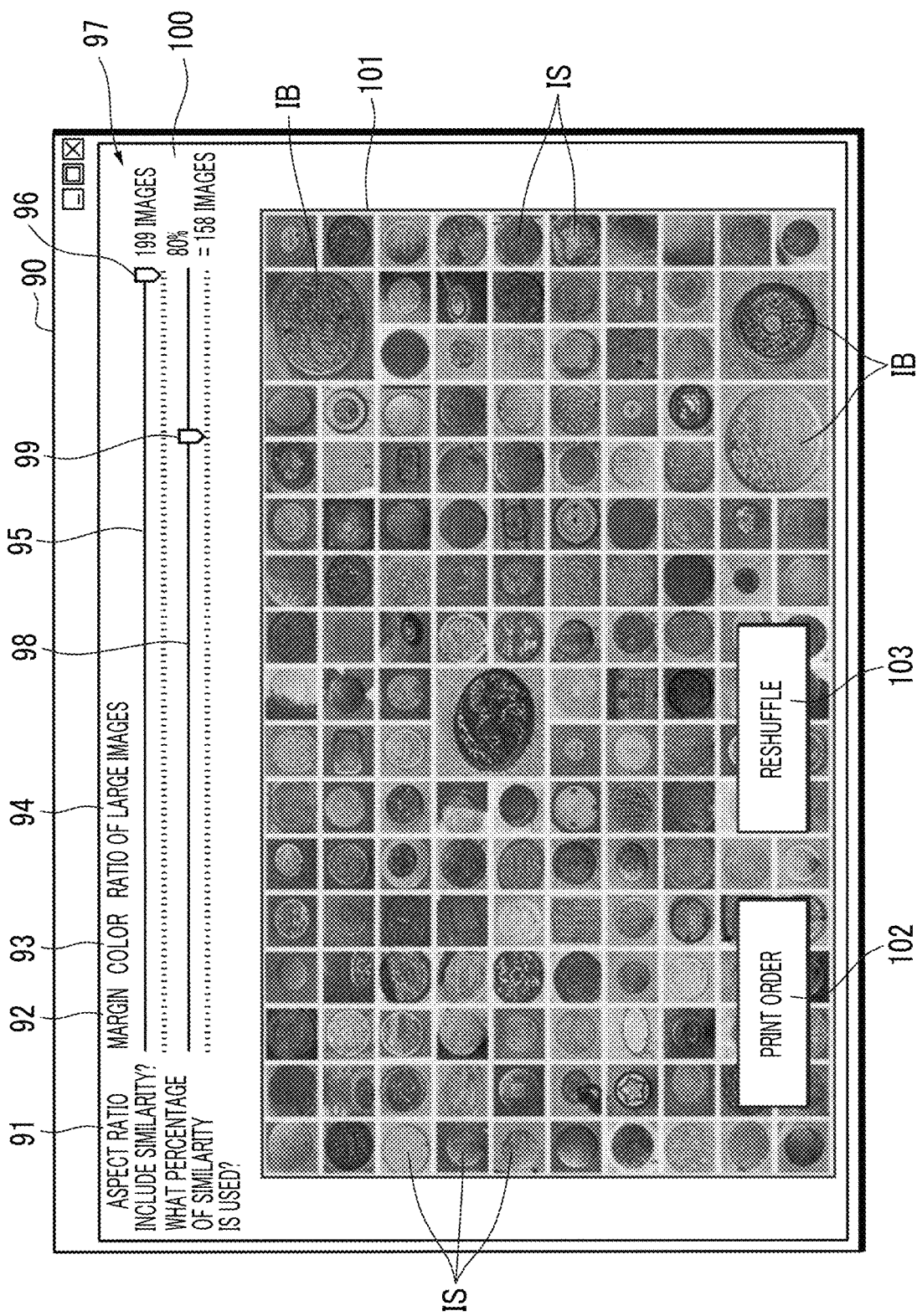
FIG. 18 is an example of a shuffle print window.

FIG. 18 is an example of the shuffle print window 90 that displays the composite image for shuffle printing.

A print display frame 101 is formed in the shuffle print window 90 (list display window), and the composite image is displayed on the print display frame 101 under the control of the CPU 2 (a list display control device). The composite image to be packed and displayed in the print display frame 101 is printed on one sheet. The composite image displayed in the print display frame 101 includes a relatively large image IB and a relatively small image IS. The relatively large image IB is an image with a high evaluation value.

A print order button 102 for displaying a character string of "print order" and a reshuffle button 103 for displaying a character string of "reshuffle" in an overlapping manner on the composite image for shuffle printing are formed at the lower left portion of the composite image for shuffle printing.

In the upper left portion of the shuffle print window 90, a character string 91 of "aspect ratio", a character string 92 of "margin", a character string 93 of "color" and a character string 94 of "ratio of large image" are displayed. In a case where each of these character strings 91, 92, 93, and 94 is clicked, an aspect ratio setting menu, a margin setting menu, a color setting menu and a ratio setting menu corresponding to the clicked character string appear. The display form of the composite image displayed on the print display frame 101 is set by setting the aspect ratio setting menu, the margin setting menu, the color setting menu, and the ratio setting menu with the mouse 9 (a display form setting device).

A first slider 95 (a second designation device) extending in the lateral direction is formed on the upper portion of the shuffle print window 90. The number of images 97 corresponding to the position of the first slider 95 is displayed on the right side of the first slider 95. A first knob 96 is movable left and right on the first slider 95. The first slider 95 is used by the user to designate the number of images (may be the ratio) of the images included in the composite image for shuffle printing that include more similar images. The number of similar images (or the ratio) increases as the first knob 96 is positioned on the right side, and the number of similar images (or the ratio) decreases as the first knob 96 is positioned on the left side.

Further, a second slider 98 (a first designation device) is formed below the first slider 95. A second knob 99 is movable left and right on the second slider 98. The second slider 98 designates the number of images (may be the ratio) to be designated for shuffle printing among the number of images designated by the first slider 95. The ratio and the number of images 100 are displayed on the right side of the second slider 98. The number of images (or the ratio) to be used increases as the second knob 99 is positioned on the right side, and the number of images (or the ratio) to be used decreases as the second knob 99 is positioned on the left side.

In the shuffle print window 90 shown in FIG. 18, the second slider 98 designates the number of images (or the ratio) to be designated for shuffle printing among the number of images designated by the first slider 95, but the second slider 98 may be provided with the second slider 98 (the third designation device) without providing the first slider 95. In a case where only the second slider 98 is provided in the shuffle print window 90, the number of images (or the ratio) to be used for the composite image for shuffle printing among the images included in the designated representative image is designated. The first slider 95 and the second slider 98 also set the display form (a display form setting device).

In a case where the print order button 102 is pressed (YES in step S47 of FIG. 6), print order processing such as the transmission of a shuffle print order command from the image processing apparatus 1 to the print order server is performed (step S49 in FIG. 6). The composite image displayed in the shuffle print window 90 is printed, and the printed composite image reaches the user.

In a case where the reshuffle button 103 is pressed (YES in step S48 of FIG. 6), at least a part of the images displayed on the print display frame 101 are changed, the ratio of the large images is changed, or the arrangement position of the large images is changed, thereby generating a new composite image for shuffle printing (step S45 in FIG. 6). The newly generated composite image is displayed in the print display frame 101 (step S46 in FIG. 6).

Figure 19:
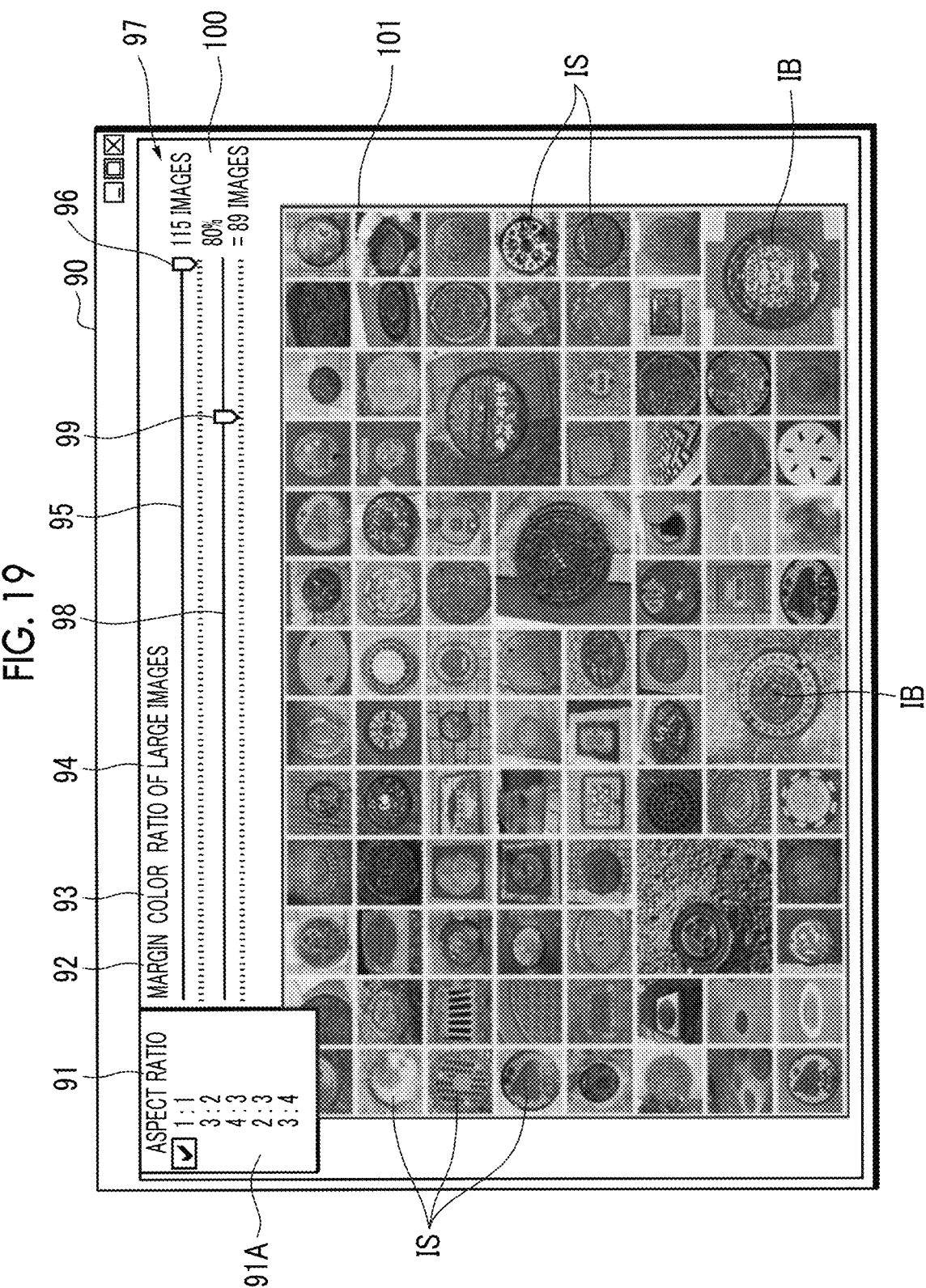
FIG. 19 is an example of a shuffle print window.

In a case where the character string 91 of the aspect ratio is clicked without pressing either the print order button 102 (NO in step S47 of FIG. 6) or the reshuffle button 103 (NO in step S48 of FIG. 6), an aspect ratio setting menu 91A appears as shown in FIG. 19.

The aspect ratio setting menu 91A is a menu for selling the aspect ratio of the image included in the composite image for shuffle printing. In the aspect ratio setting menu 91A, numerical values representing aspect ratios of 1:1, 3:2, 4:3, 2:3, and 3:4 are displayed, and the user can designate an aspect ratio corresponding to the checked numerical values by checking the left side of any of the numerical values.

FIG. 19 shows an example of a composite image in a case where the aspect ratio of 1:1 is designated. The aspect ratios of the images IS and IB included in the composite image are both 1:1.

Figure 20:
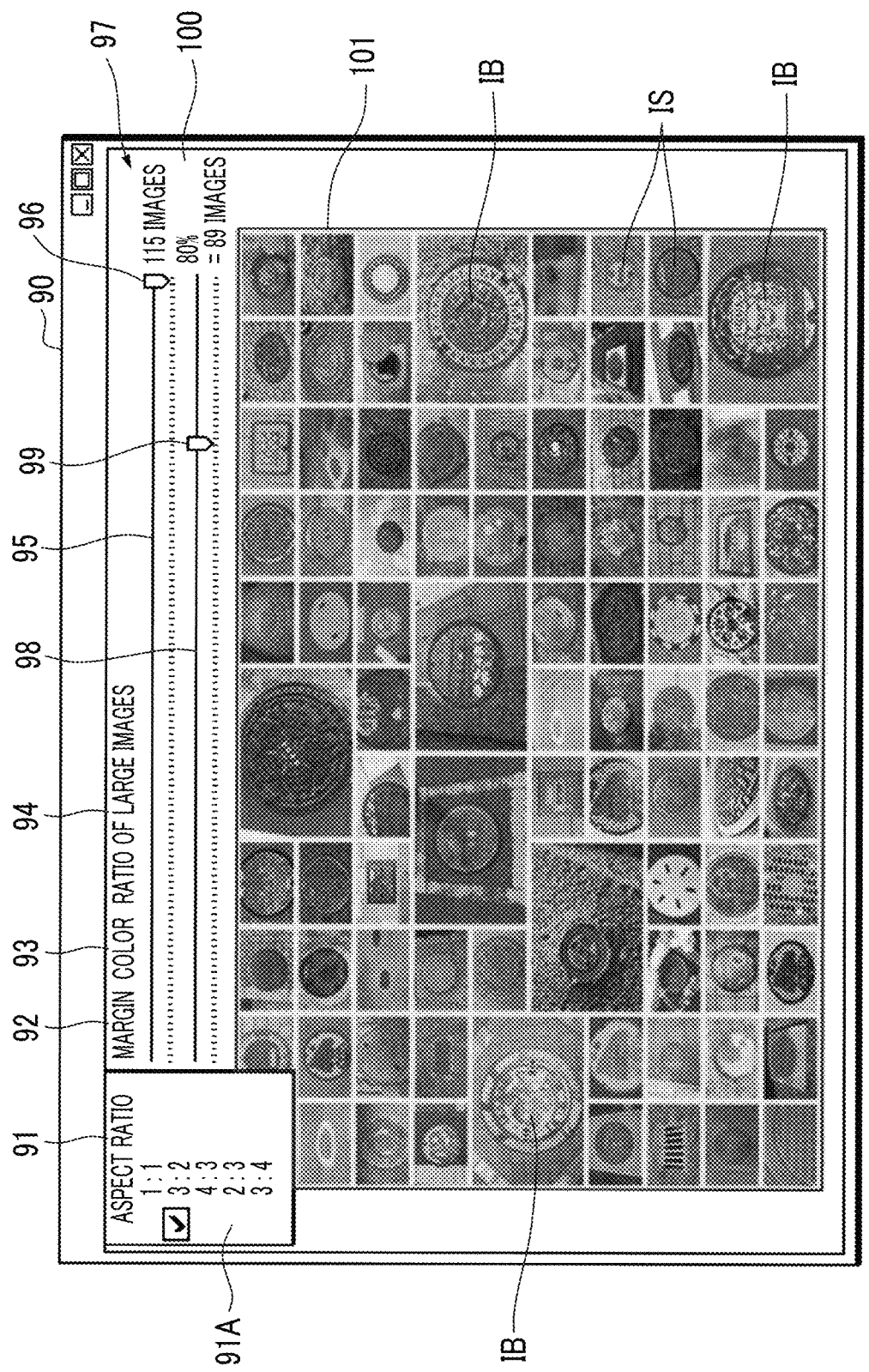
FIG. 20 is an example of a shuffle print window.

FIG. 20 shows an example of a composite image in a case where the aspect ratio of 3:2 is designated. The aspect ratios of the images IS and IB included in the composite image are both 3:2. The length in the lateral direction is 3 and the length in the machine direction is 2, and a composite image is generated from the laterally long images.

In a case where the aspect ratio is changed by the user (YES in step S51 of FIG. 7), the composite image is generated by the image of the changed aspect ratio (step S45 in FIG. 6).

Figure 21:
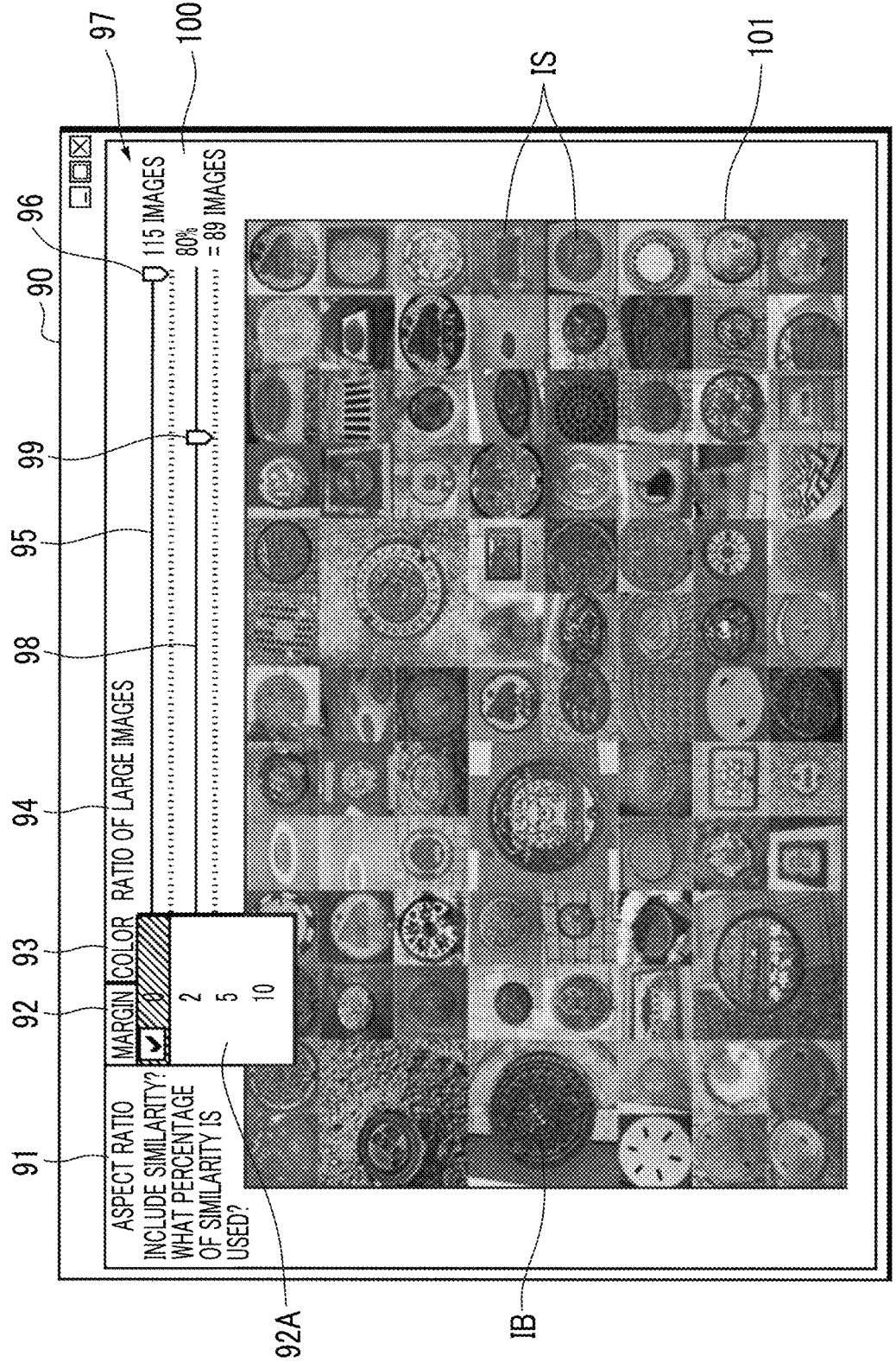
FIG. 21 is an example of a shuffle print window.

In a case where the character string 92 of the margin is clicked, a margin setting menu 92A appears as shown in FIG. 21.

The margin setting menu 92A is a menu for setting a margin between images included in a composite image for shuffle printing and a margin between an image and an edge. Numerical values representing the margins of 0 [mm], 2 [mm], 5 [mm], and 10 [mm] are displayed in the margin setting menu 92A, and the user can designate a margin corresponding to the checked numerical value by checking the left side of either numerical value.

FIG. 21 shows an example of a composite image in a case where a margin of 0 [mm] is designated. The margin between images included in the composite image and the margin between the image and the edge are zero.

Figure 22:
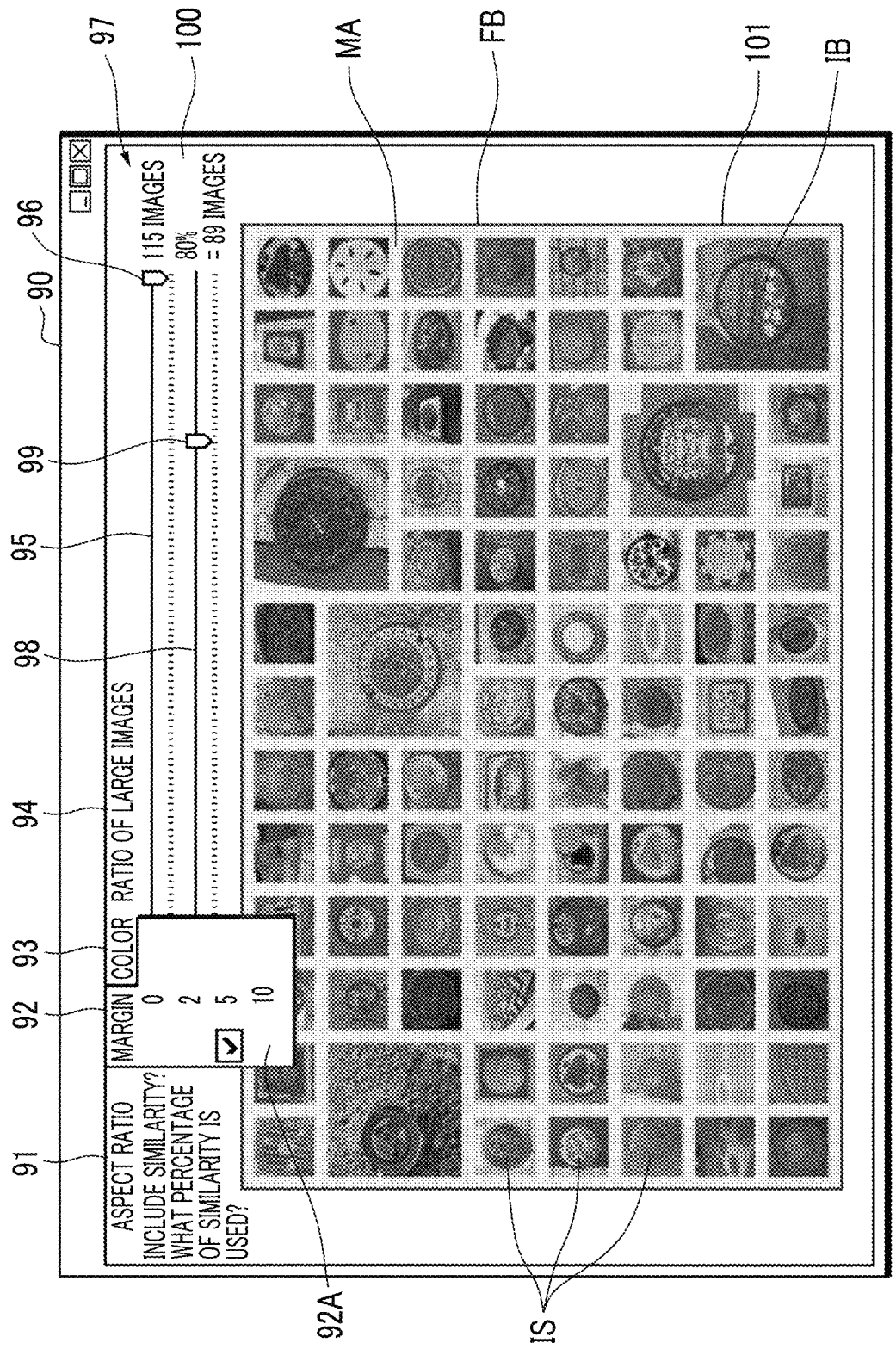
FIG. 22 is an example of a shuffle print window.

FIG. 22 shows an example of a composite image in a case where a margin MA is designated as 5 [mm]. The margin MA between the images IS and IB and between the images IS or IB and the edge included in the composite image is 5 [mm]. However, the margin MA is the margin MA in a case where the image for shuffle printing is actually printed, and the margin MA is also different from the actual size assuming that the size of the composite image in a case where the image is actually printed and the size of the displayed image are different on the display screen.

In a case where the width of the margin MA is changed by the user (YES in step S52 in FIG. 7), the composite image is generated so as to have the changed margin MA (step S45 in FIG. 6).

Figure 23:
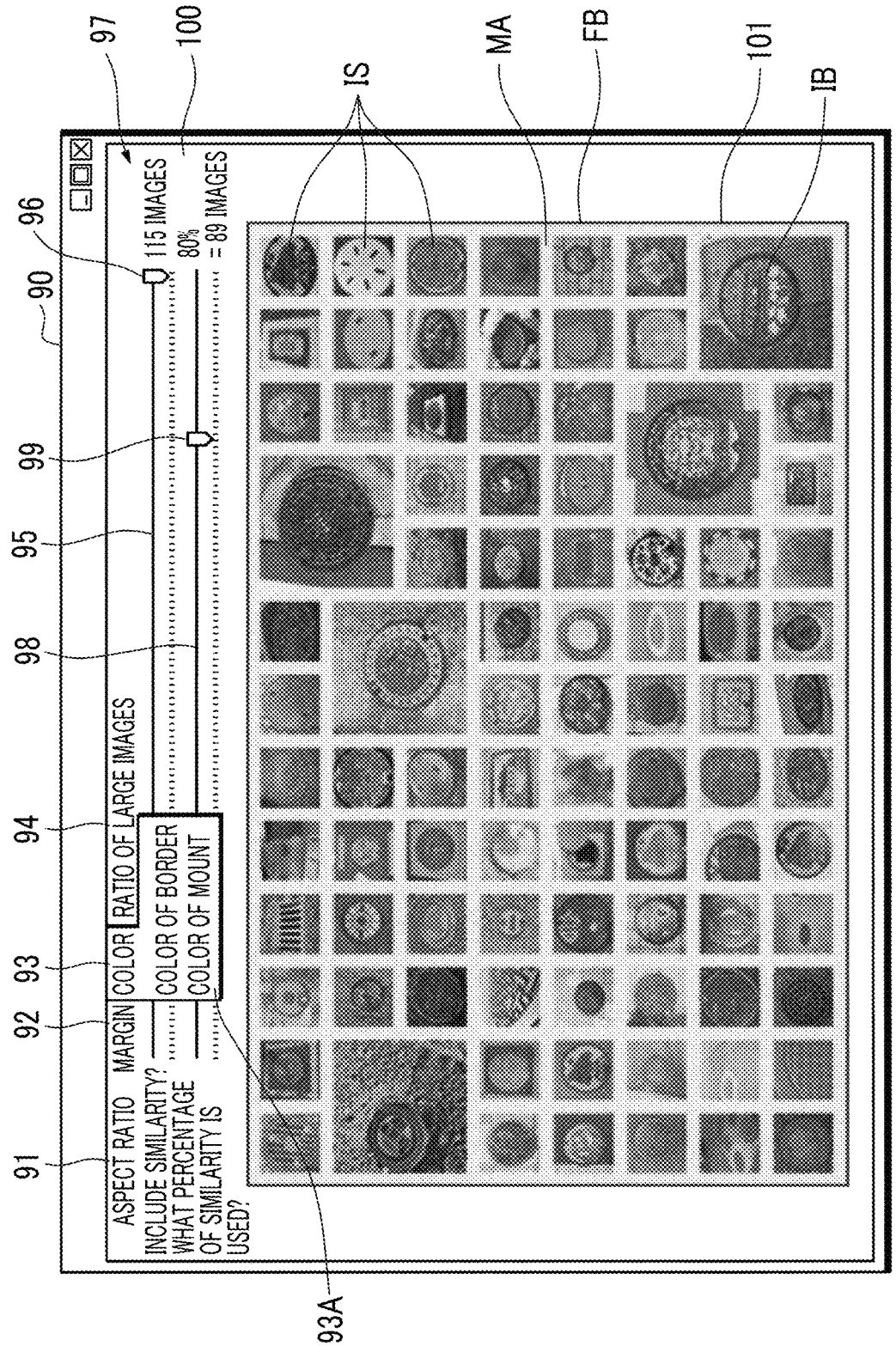
FIG. 23 is an example of a shuffle print window.

In a case where the character string 93 of the color is clicked, a color setting menu 93A appears as shown in FIG. 23.

The color setting menu 93A is a menu for setting the margin MA between images included in a composite image for shuffle printing and the color of the margin MA between an image and an edge. In the color setting menu 93A, the "color of the border" and the "color of the mount" are displayed, and the user can designate the color of the margin MA corresponding to the checked character string by checking the left side of either character string.

Figure 24:
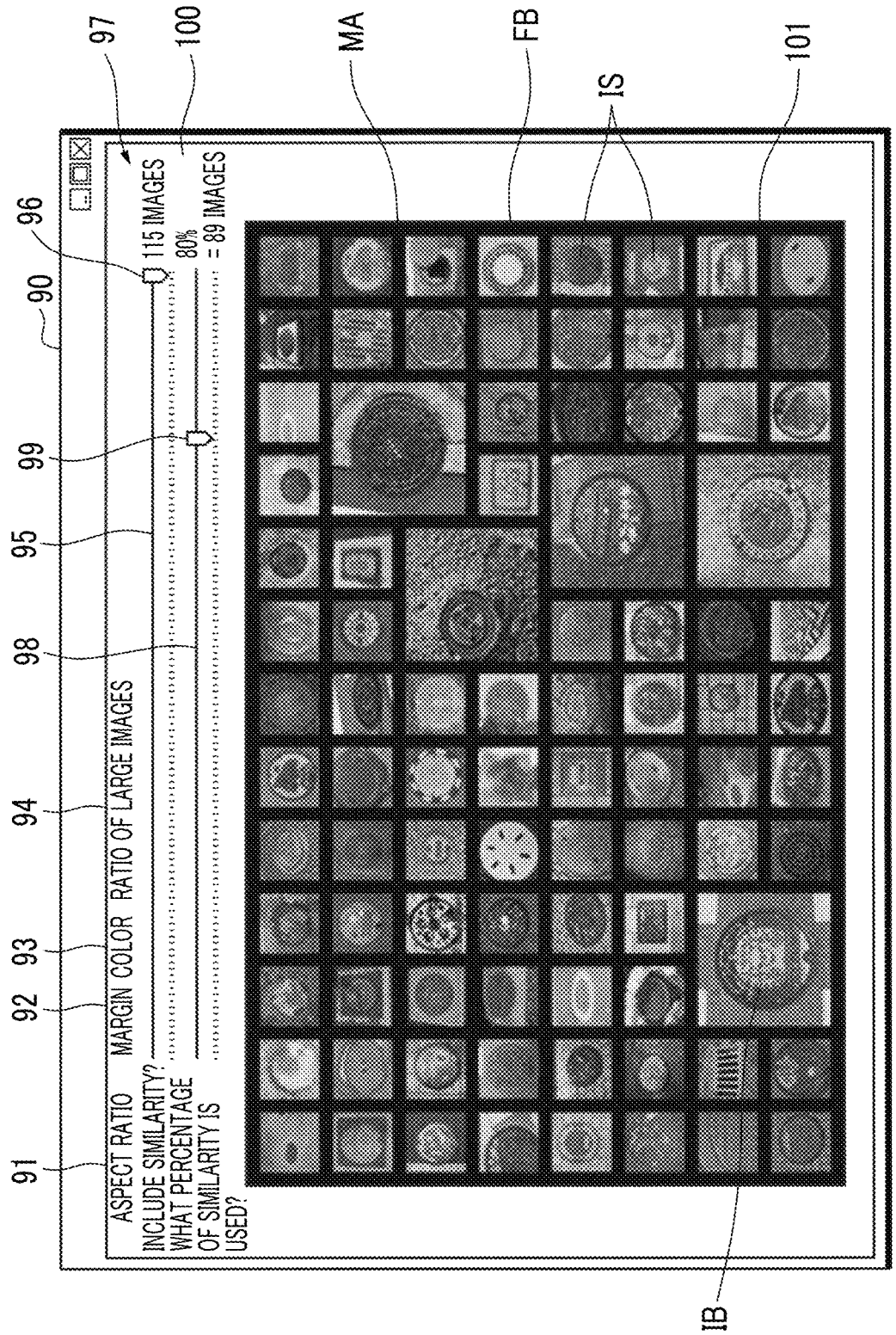
FIG. 24 is an example of a shuffle print window.

FIG. 24 shows an example of a composite image in a case where the color of the mount is designated as the color of the margin MA. The colors of the margin MA between the images and the margin MA between the image and the edge included in the composite image are the colors of the mount. The complementary color of the dominant color of the image that generates the composite image is used as the color of the mount, but a color palette or the like may be displayed such that the user can designate the color. In a case where the color of the border FB is designated as the color of the margin MA, the color of the margin MA may be a predetermined color of the border FB (color of the border of composite image) or may be designated by the user using a color palette.

In a case where the color of the margin MA is changed by the user (YES in step S53 in FIG. 7), the composite image is generated so as to have the changed margin MA (step S45 in FIG. 6).

Figure 25:
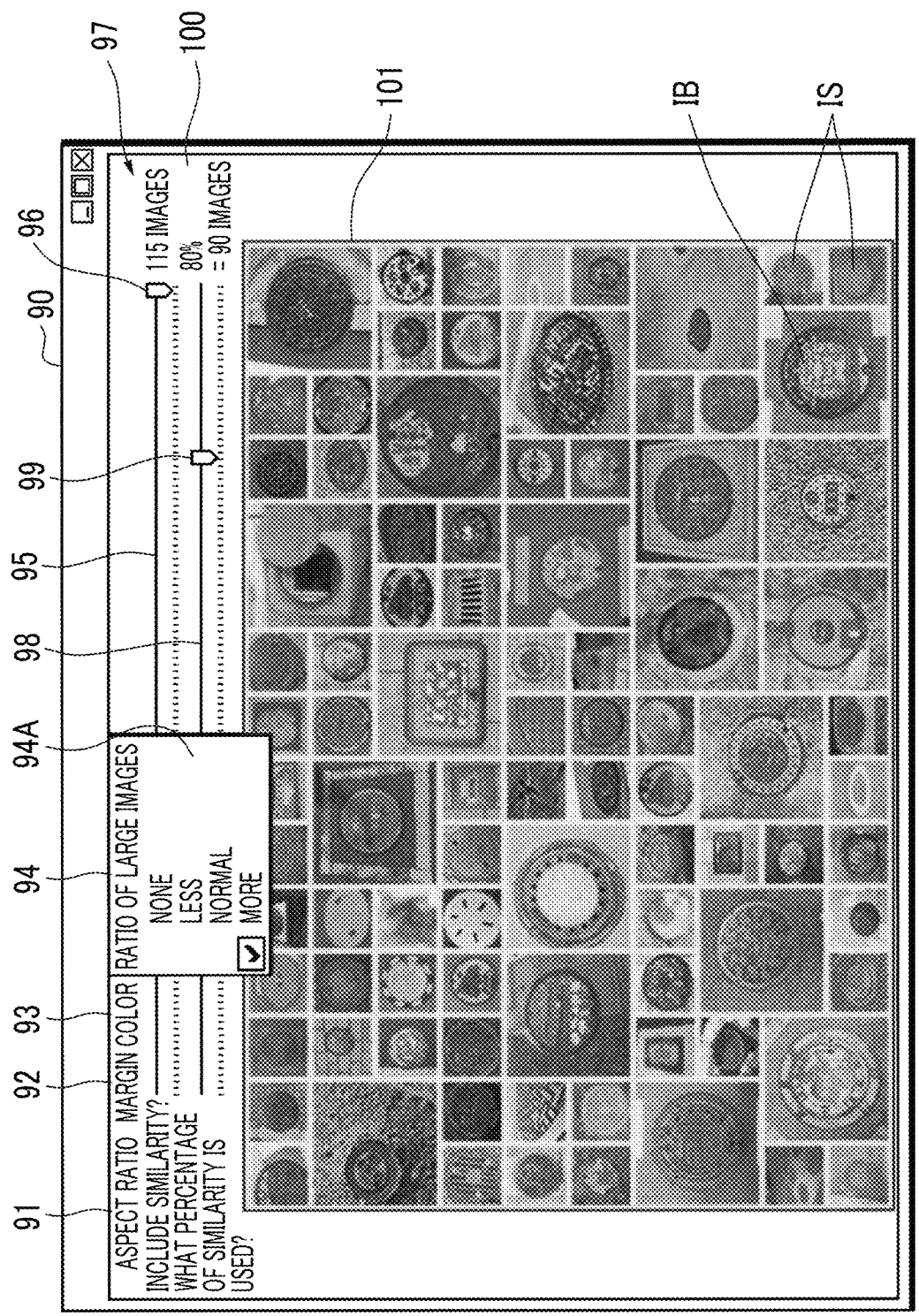
FIG. 25 is an example of a shuffle print window.

In a case where the character string 94 of the "ratio of large images" is clicked, a ratio setting menu 94A for the large image appears as shown in FIG. 25.

The ratio setting menu 94A is a menu for setting the ratio of the relatively large image IB included in the shuffle print composite image. Character strings of "none", "less", "normal" and "more" are displayed in the ratio setting menu 94A, and the user can designate the ratio of a relatively large image corresponding to the checked character string by checking the left side of any character string.

FIG. 25 shows an example of a composite image in a case where "more" is designated. The ratio of the relatively large image IB included in the composite image increases.

Figure 26:
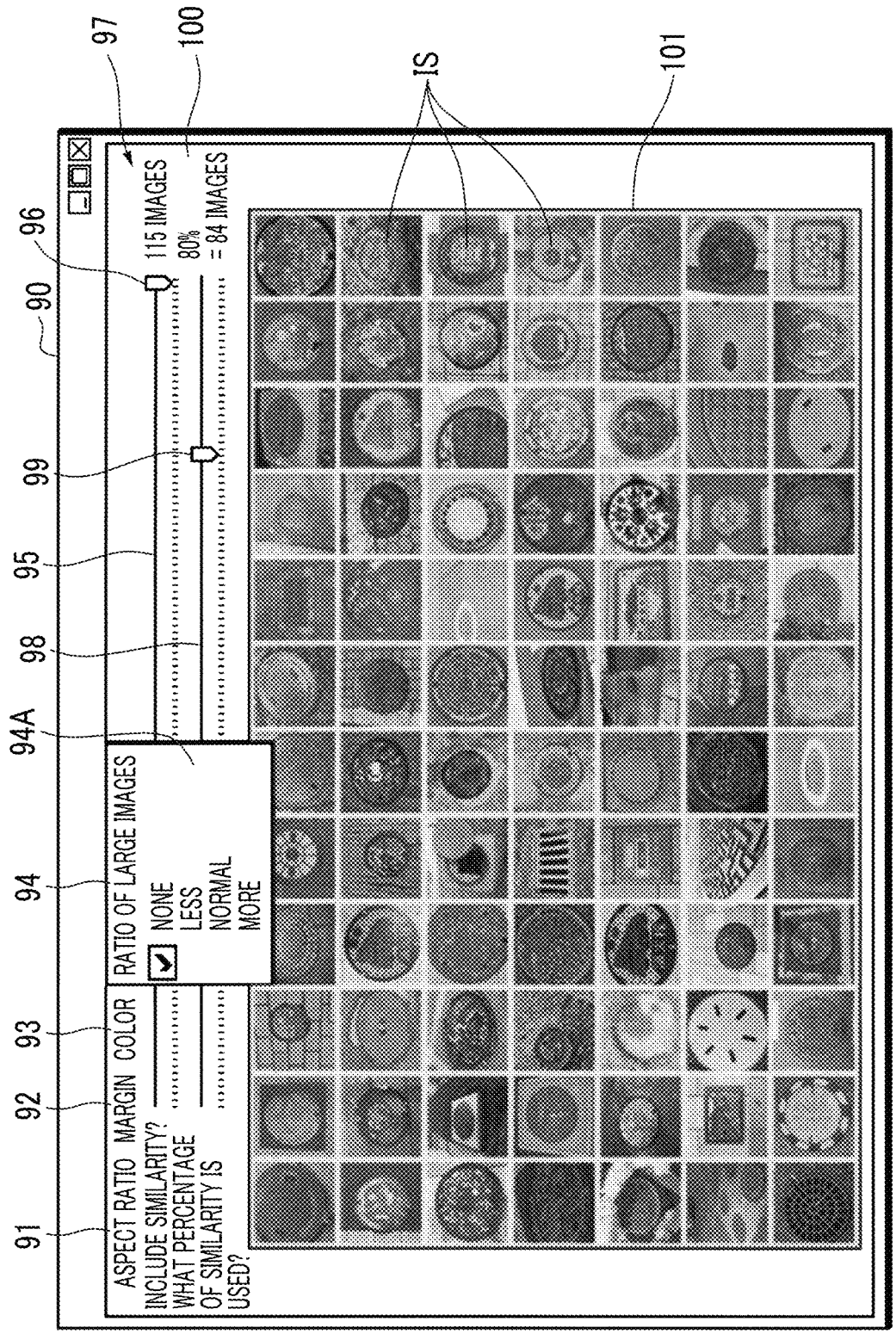
FIG. 26 is an example of a shuffle print window.

FIG. 26 shows an example of a composite image in a case where "none" is designated. The relatively large image IB is not included in the composite image.

In a case where the ratio of a large image is changed by the user (YES in step S54 in FIG. 7), the composite image is generated so as to have the changed ratio (step S45 in FIG. 6).

In a case where the first knob 96 is moved on the first slider 95 (YES in step S55 of FIG. 7), the number of similar images (more similar images) among the images used for the composite image for shuffle printing is determined according to the position of the moved first knob 96. A composite image is generated by using the determined number of images (step S45 in FIG. 6).

In a case where the second knob 99 is moved on the second slider 98 (YES in step S56 of FIG. 7), the number of images used for the composite image for shuffle printing is determined from the number of images determined depending on the position of the first knob 96, according to the position of the moved second knob 99. A composite image is generated by using the determined number of images (step S45 in FIG. 6).

Therefore, the number (ratio used) of similar images to be used can be designated by using the first knob 96, and the number (ratio) of images to be actually used can be designated among the designated number of similar images to be used by using the second knob 99.

Figure 27:
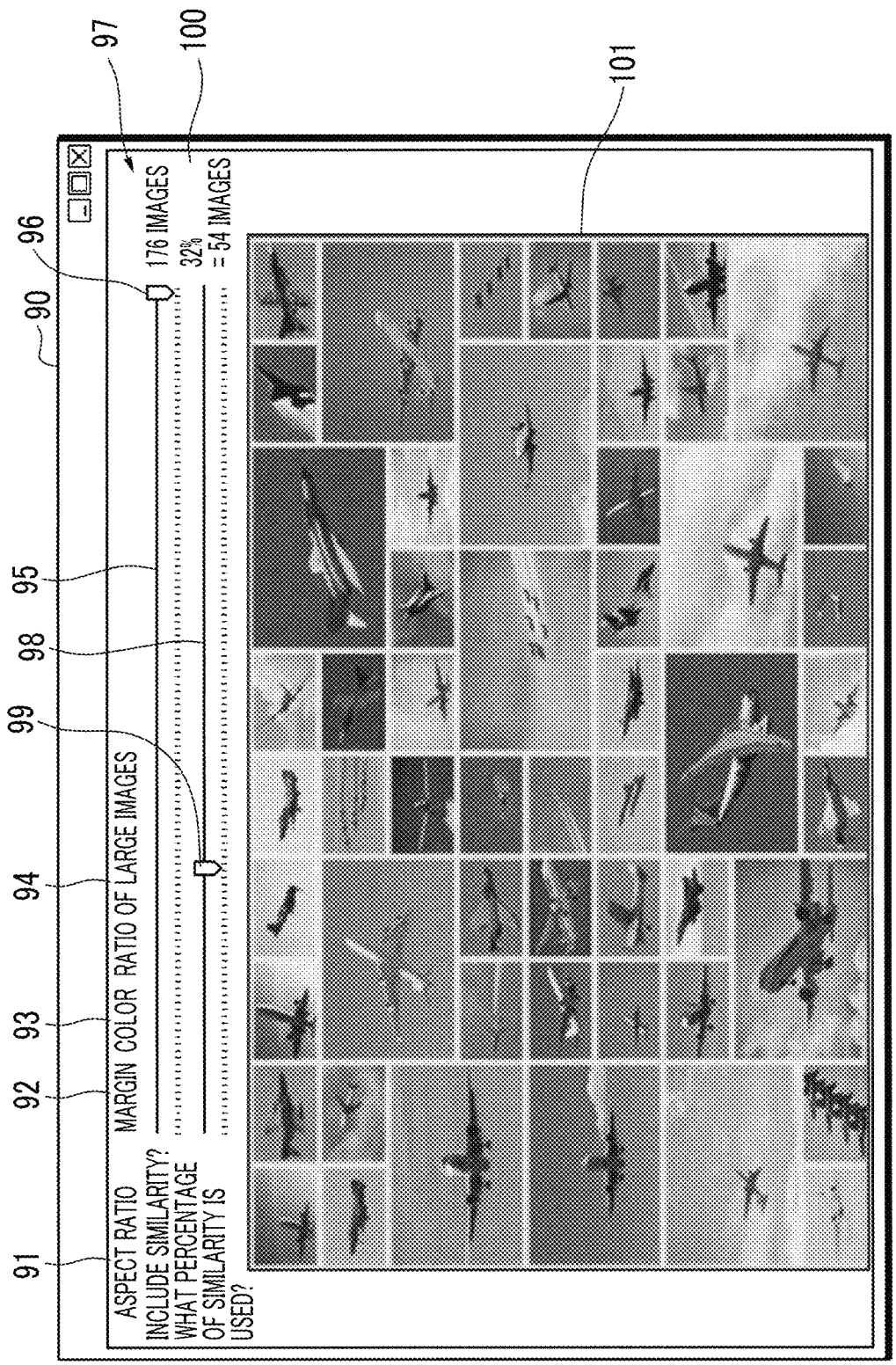
FIG. 27 is an example of a shuffle print window.

FIG. 27 shows an example of a composite image in a case where a representative image IR5 (image of an airplane) is selected from among the representative images IR1 to IR 10 displayed in the classification result display window 80 to display a similar image, and in a case where the shuffle print button B3 is pressed, the first knob 96 is positioned to the right end of the first slider 95, and the second knob 99 is positioned to the relatively left side of the second slider 98.

In this case, as designated by the position of the first knob 96, the ratio of similar images is high, but the total number of images IB and IS included in the composite image is relatively small.

Figure 28:
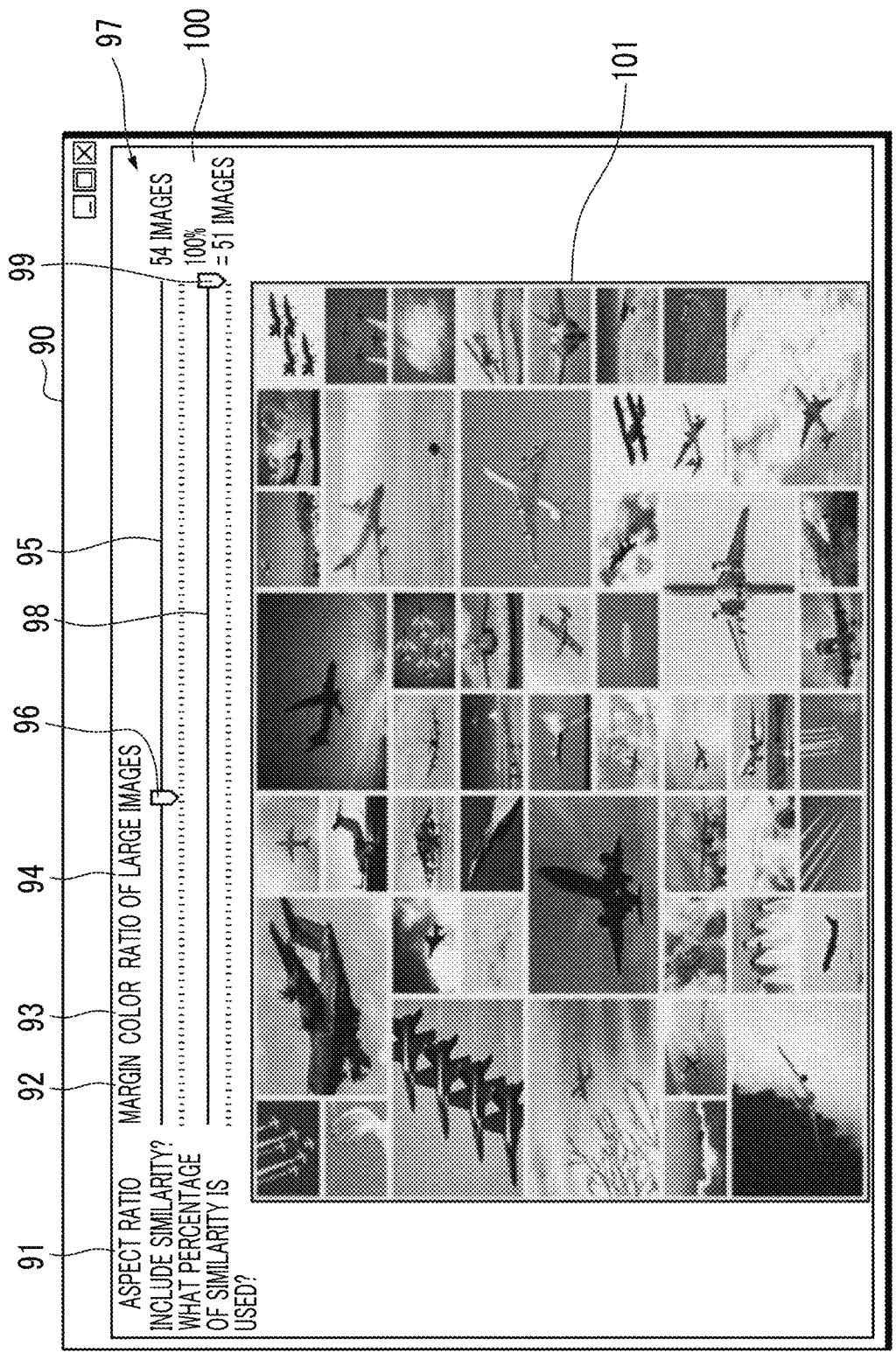
FIG. 28 is an example of a shuffle print window.

FIG. 28 is an example of a composite image in a case where the first knob 96 is positioned to the relatively left side of the first slider 95 and the second knob 99 is positioned to the relatively right side of the second slider 98.

In this case, as designated by the position of the first knob 96, the total number of images IB and IS included in the composite image is relatively small in a state where the ratio of more similar images is small.

Figure 29:
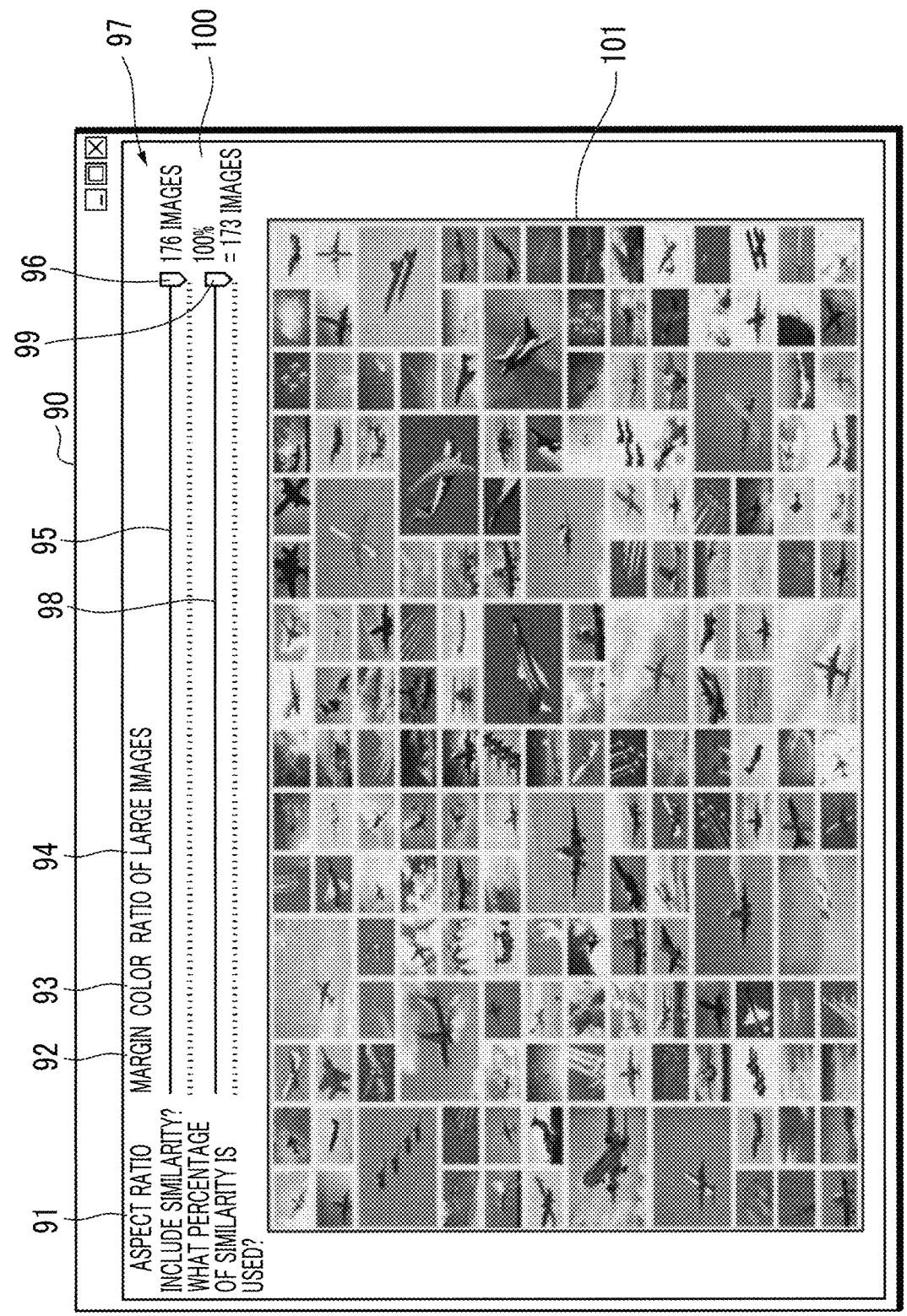
FIG. 29 is an example of a shuffle print window.

FIG. 29 is an example of a composite image in a case where the first knob 96 is positioned to the right end of the first slider 95 and the second knob 99 is positioned to the relatively right side of the second slider 98.

In this case, as designated by the position of the first knob 96, the ratio of similar images is high, but the total number of images IB and IS included in the composite image is also large.

Figure 30:
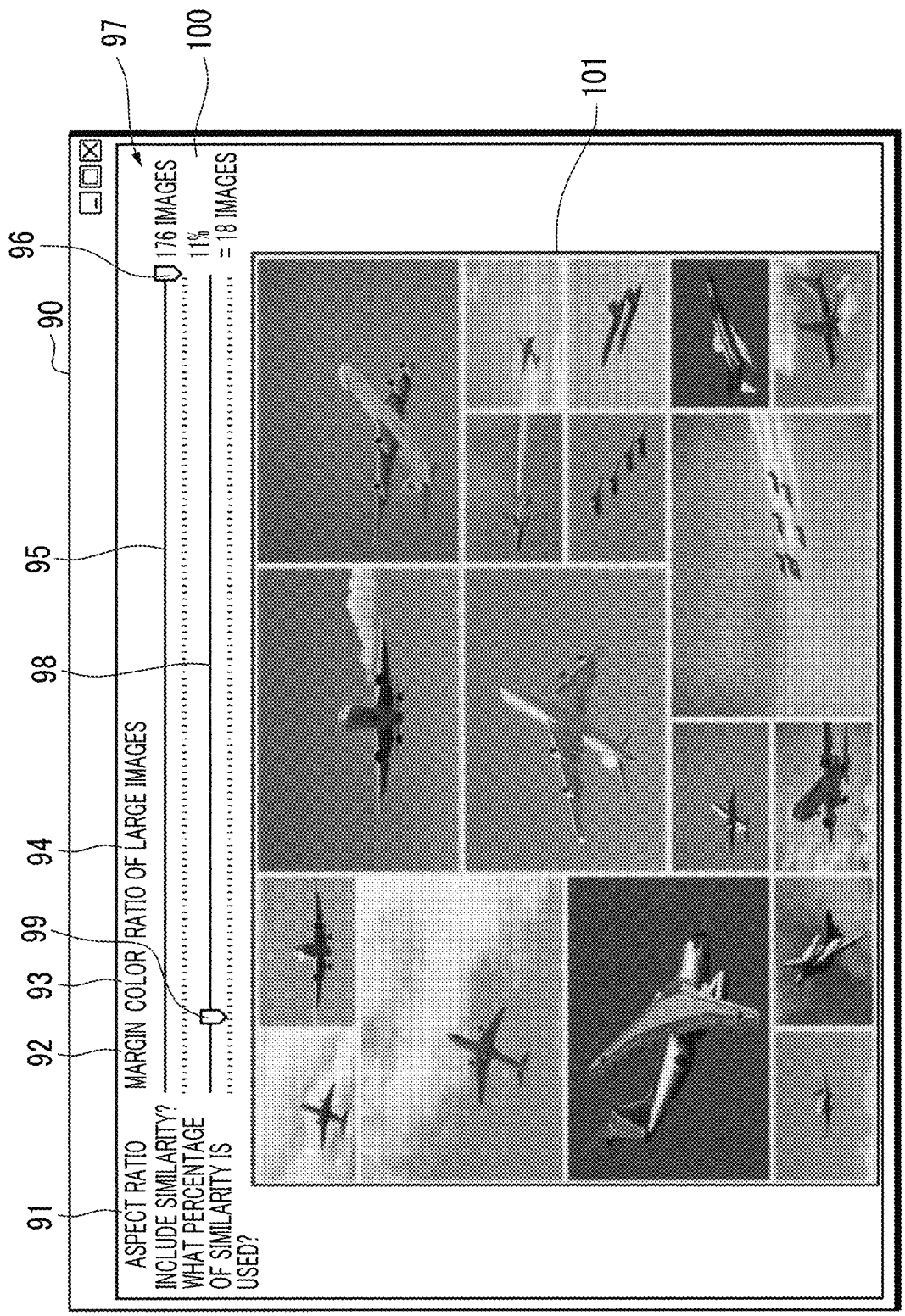
FIG. 30 is an example of a shuffle print window.

FIG. 30 is an example of a composite image in a case where the first knob 96 is positioned to the right end of the first slider 95 and the second knob 99 is positioned to the relatively left side of the second slider 98.

In this case, as designated by the position of the first knob 96, the ratio of similar images is high, but the total number of images IB and IS included in the composite image is relatively small.

In this way, by moving the first knob 96 and the second knob 99, it becomes possible to adjust the degree of similarity of images included in the composite image and the number of images.

[Example of Puzzle Game]

As shown in FIG. 17, in a case where the user selects any of the images displayed in the second classification window 70A (YES in step S50 of FIG. 6) and presses the puzzle game button B4 (YES in step S57 of FIG. 8), a game start command is generated. The selected image is divided into a plurality of pieces (image parts), rearranged and displayed in a puzzle window 120 (step S58 in FIG. 8).

Figure 31:
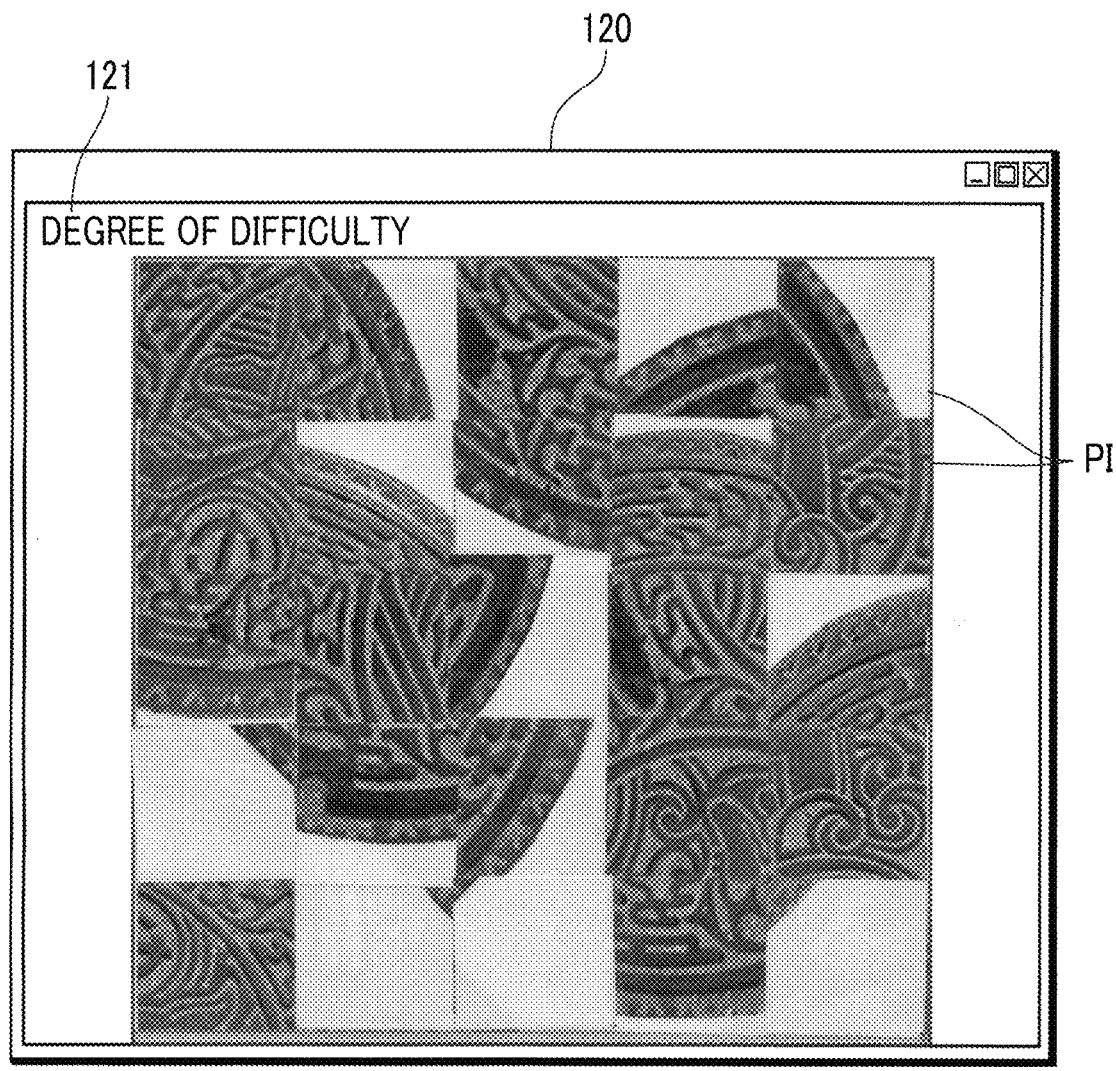
FIG. 31 is an example of a puzzle game window.

FIG. 31 is an example of the puzzle window 120.

In the puzzle window 120, images in which pieces PI are rearranged are displayed.

In the upper left portion of the puzzle window 120, a character string 121 of the "degree of difficulty" is displayed.

In a case where the character string 121 of the "degree of difficulty" is selected, a menu for setting the degree of difficulty of the puzzle game appears, and the user can select the degree of difficulty. For example, the number of pieces PI such as 5×5 blocks and 4×4 blocks can be selected, and the number of pieces PI changes depending on the selected degree of difficulty.

Measurement of time in a puzzle game is started (step S59 in FIG. 8), a user gives a movement command of the piece PI by using a mouse 9 (step S60 in FIG. 8), and the CPU 2 (an image part rearrangement device) moves the piece PI in response to the movement command to complete an original image. In a case where the original image is completed (YES in step S61 of FIG. 8), the measurement of time ends (step S62 in FIG. 8).

Data representing the time until completion is transmitted to a puzzle game server (not shown), and a user ranking is calculated from the time required for the user to complete the puzzle game server. The data representing the calculated ranking is received by the image processing apparatus 1 (ranking check) (step S63 in FIG. 9). Then, the ranking of the users is displayed (step S64 in FIG. 9).

Figure 32:
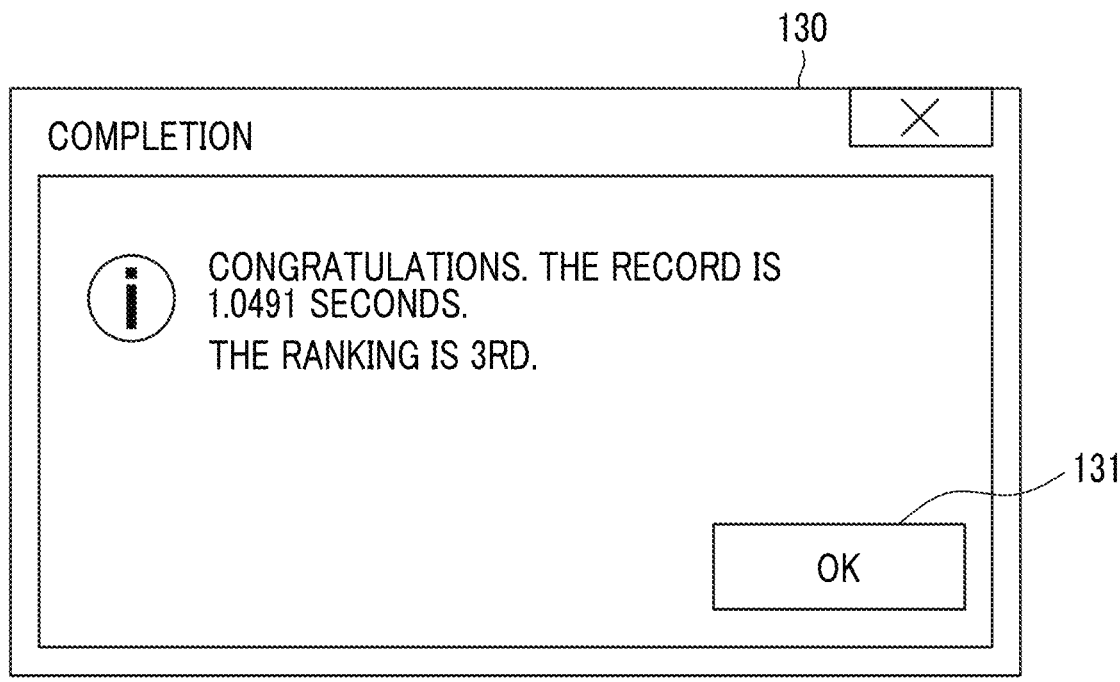
FIG. 32 is an example of a ranking display window.

FIG. 32 is an example of a ranking display window 130.

A ranking display window 130 is also displayed on the display screen of the display apparatus 3. In the ranking display window 130, the time until the user completes the puzzle and the ranking are displayed. An OK button 131 in which a character string "OK" is displayed is formed at the lower right of the ranking display window 130. In a case where the OK button 131 is pressed, the ranking display window 130 disappears from the display screen.

Figure 9:
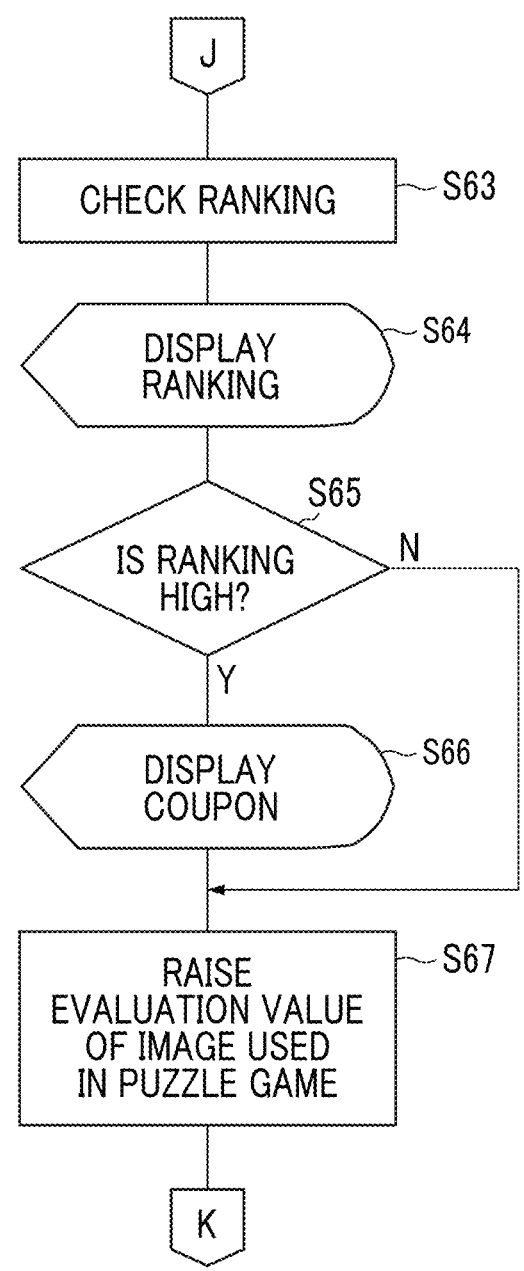
FIG. 9 is a flowchart showing a processing procedure of an image processing apparatus.
Figure 33:
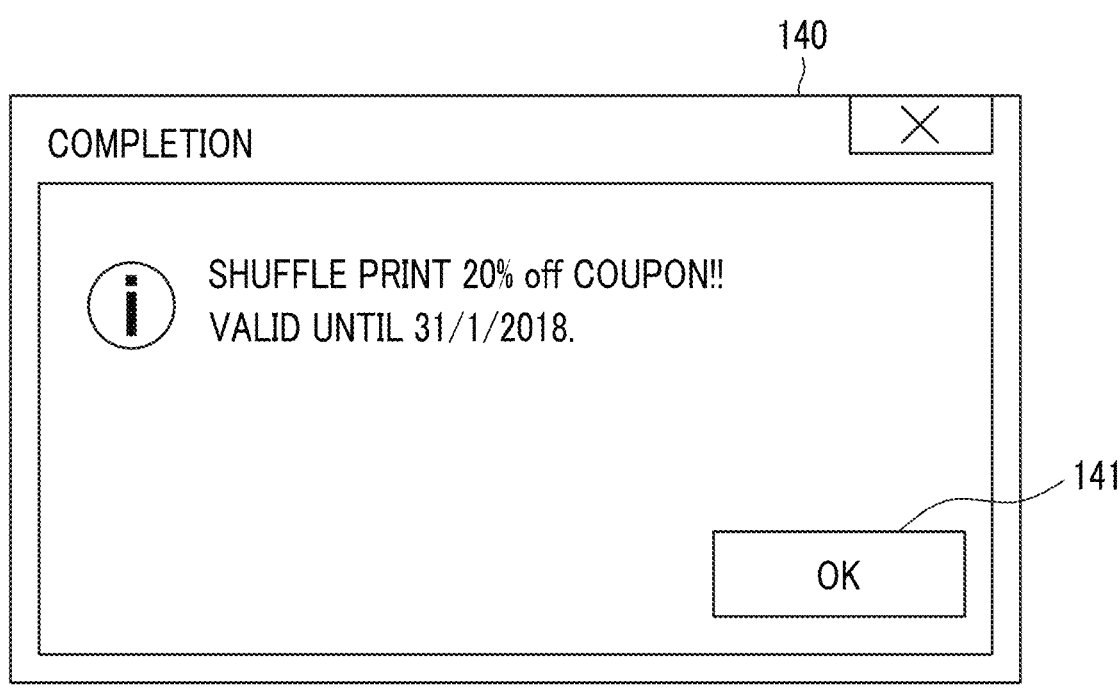
FIG. 33 is an example of a coupon window.

In a case where the ranking of the user is high (YES in step S65 of FIG. 9), a coupon window 140 shown in FIG. 33 is displayed on the display screen of the display apparatus 3 (step S66 of FIG. 9).

The coupon window 140 displays the reason that the coupon has been given and the expiration date of the coupon. An OK button 141 in which a character string "OK" is displayed is formed at the lower right of the coupon window 140. In a case where the OK button 141 is pressed, the coupon window 140 disappears from the display screen of the display apparatus 3, and the ID usable as a coupon appears. The usage fee of the shuffle print can be reduced by inputting the ID in a case of ordering the shuffle print.

The evaluation value of the image used in the puzzle game is raised (step S67 in FIG. 9). The shuffle print is created such that the image used in the puzzle game is enlarged.

The image processing apparatus 1 described above can be configured not only as a dedicated apparatus but also using a personal computer, a tablet terminal, and a smartphone.

In addition, in the above-described example, the processing is performed in the image processing apparatus 1, but the above-described processing may be performed by using a server that can communicate with the image processing apparatus 1.

For example, image data representing a captured image is uploaded to the server every time the image is captured or each fixed number of images, and image data representing an image to be classified is uploaded to the server in a case where the image is classified as described above. Therefore, the image data is stored in the database connected to the server. An image classification command is given from the image processing apparatus 1 to the server, the above-described image classification processing (processing of step S26 in FIG. 3 to step S37 in FIG. 5 described above) is performed in the server in response to the image classification command, and data representing the determined representative image is transmitted from the server to the image processing apparatus 1.

The classification result display window 80 shown in FIG. 16 is displayed on the display screen of the display apparatus 3 of the image processing apparatus 1, and in a case where any representative image is double-clicked, identification data of the double-clicked representative image is transmitted from the image processing apparatus 1 to the server. Image data representing an image included in a group represented by a representative image specified by the identification data received by the server is found and transmitted from the server to the image processing apparatus 1. Therefore, on the display screen of the display apparatus 3 of the image processing apparatus 1, for example, the second classification window 70A shown in FIG. 17 is displayed.

Further, for classification, the second designation classification button B11 or the second automatic classification button B12 is pressed, the classification command is transmitted to the server, and the server classifies the images.

In a case where the shuffle print button B3 is pressed, a shuffle command is transmitted from the image processing apparatus 1 to the server, and the server performs image composition for shuffle printing. Image data representing the result of image composition is transmitted from the server to the image processing apparatus 1, and the shuffle print window 90 shown in FIG. 18 is displayed. In a case where the print order button 102 is pressed, a print order command is transmitted to the server, and in a case where the reshuffle button 103 is pressed, a reshuffle command is transmitted to the server, and image composition for shuffle printing is performed again. In addition, as described with reference to FIGS. 21 to 30, in a case where a command to change a display form such as an aspect ratio is performed, the change command is transmitted to the server, and the server performs the image composition for shuffle printing again in response to the change command.

In a case where the puzzle game button B4 is pressed, the puzzle game command is transmitted from the image processing apparatus 1 to the server, the image selected by the user is divided in the server, and data obtained by dividing the image into a plurality of image parts as shown in FIG. 31 is transmitted to the image processing apparatus 1. In a case where the game ends, end data is transmitted to the server, and the server displays the ranking display window 130 shown in FIG. 32, the coupon window 140 shown in FIG. 33, and the like on the image processing apparatus 1.

A processing unit that executes the above-described processing includes, in addition to the CPU 2 that executes software and functions as various processing units, a programmable logic device, such as a field-programmable gate array (FPGA), whose circuit configuration can be changed after manufacture, and a dedicated electric circuit, which is a processor having a circuit configuration specifically designed to execute specific processing such as an application specific integrated circuit (ASIC).

One processing unit may be configured with one of these various processors, or may be configured with a combination (for example, a plurality of FPGAs, a combination of CPUs and FPGAs) of two or more processors of the same kind or different kinds. As an example in which a plurality of processing units are configured with a single processor, there is a first aspect in which one processor is configured by a combination of one or more CPUs and software as represented by a computer such as a client computer and a server, and this processor functions as a plurality of processing units. Next, as represented by a system on chip or the like, there is a second aspect of using a processor that realizes the function of the entire system including a plurality of processing units with one integrated circuit (IC) chip. In this way, various processing units are configured using one or more of the above-mentioned various processors as hardware structures.

Furthermore, a hardware structure of these various processors is, more specifically, an electric circuit in which circuit elements such as semiconductor elements are combined.

What is claimed is:

1. An image processing apparatus comprising:
    an image classification device for classifying a plurality of images into a plurality of groups for images similar to each other in response to a classification command;
    a representative image display control device for displaying an image representing the group for each group classified by the image classification device on a display screen of a display apparatus;
    a representative image selection device for selecting at least one representative image from among representative images displayed under a control of the representative image display control device;
    a similar image display control device for displaying an image included in a group represented by the representative image selected by the representative image selection device on the display screen of the display apparatus;
    a list display command input device for inputting list display command;
    a list display control device for displaying a list of the images included in the group represented by the representative image selected by the representative image selection device in a list display window displayed on the display screen of the display apparatus in response to input of the list display command from the list display command input device;
    a first slider display control device for displaying a first slider on the display screen of the display apparatus in a movable manner on the display screen; and
    a first image determining device for determining images displayed in the list display window on the basis of a ratio or a number based on a moved position of the first slider, wherein the list display control device displays the list of images determined by the first image determining device in the list display window.

2. The image processing apparatus according to claim 1, wherein the image classification device further classifies the image displayed by the similar image display control device into a plurality of groups for more similar images in response to the classification command.

3. The image processing apparatus according to claim 1, further comprising:
a group number input device for inputting the number of groups classified by the image classification device, wherein
the image classification device performs a first stage classification that classifies a plurality of images into a plurality of groups for images similar to each other in response to the classification command, and
the image classification device performs a second stage classification that combines groups having similar images included in the groups among the groups obtained by the first stage classification such that the number of groups obtained by the first stage classification becomes the number of groups input from the group number input device in a case where the number of groups obtained by the first stage classification is larger than the number of groups input from the group number input device.

4. The image processing apparatus according to claim 3, wherein the image classification device performs the second stage classification that divides the images in the group obtained by the first stage classification such that the number of groups obtained by the first stage classification becomes the number of groups input from the group number input device in a case where the number of groups obtained by the first stage classification is smaller than the number of groups input from the group number input device.

5. The image processing apparatus according to claim 1, further comprising:
an automatic classification command input device for inputting an automatic classification command for groups; and
a threshold value input device for inputting a threshold value of similarity indicating whether or not images are similar, wherein
the image classification device performs a first stage classification that classifies a plurality of images into a plurality of groups for images similar to each other in response to the automatic classification command, and
the image classification performs a second stage classification that combines the first group and the second group in a case where the similarity indicating whether or not the images included in the first group and the images included in the second group among the plurality of groups obtained in the first stage classification are similar is within the threshold value input from the threshold value input device.

6. The image processing apparatus according to claim 1, further comprising:
a first designation device for designating a ratio or a number of images that are more similar among the images displayed in a list in the list display window,
wherein the list display control device displays the list of images in the list display window on the basis of the ratio or the number of images designated by the first designation device.

7. The image processing apparatus according to claim 6, further comprising:
a second designation device for designating a ratio or a number of images displayed in the list display window among the ratio or the number of images designated by the first designation device,
wherein the list display control device displays the list of images in the list display window on the basis of the ratio or the number of images designated by the second designation device.

8. The image processing apparatus according to claim 1, further comprising:
a display form setting device for setting a display form of images displayed in the list display window,
wherein the list display control device displays the list of images in the list display window according to the display form set by the display form setting device.

9. The image processing apparatus according to claim 8, wherein the display form set by the display form setting device is at least one of an aspect ratio of an image, a size of a margin between images, a color of a margin between images, or a ratio of a large image.

10. The image processing apparatus according to claim 1, further comprising:
a margin color decision device for deciding a color of a margin between the images displayed in the list display window on the basis of colors of the images displayed in the list display window.

11. The image processing apparatus according to claim 1, wherein the list display control device displays the images included in the group represented by the representative image selected by the representative image selection device to be packed in a print display frame on one sheet in the list display window.

12. The image processing apparatus according to claim 1, further comprising:
an evaluation value calculation device for calculating an evaluation value of an image on the basis of a content of the image,
wherein the list display control device obtains an evaluation value by the evaluation value calculation device for each of the images included in the group represented by the representative image selected by the representative image selection device, and displays an image having a high evaluation value in a larger size than other images.

13. The image processing apparatus according to claim 1, further comprising:
an image part rearrangement device for, with respect to a designated image among the images displayed under a control of the image display control device, rearranging and displaying image parts divided into a plurality of parts for the designated image in response to a game start command being given, and receiving movement by a user for the rearranged image parts.

14. An image processing method comprising:
classifying a plurality of images into a plurality of groups for images similar to each other in response to a classification command, by an image classification device;
displaying an image representing the group for each group classified by the image classification device on a display screen of a display apparatus, by a representative image display control device;
selecting at least one representative image from among representative images displayed under a control of the representative image display control device, by a representative image selection device;

displaying an image included in a group represented by the representative image selected by the representative image selection device on the display screen of the display apparatus, by a similar image display control device;

inputting list display command, by a list display command input device;

displaying a list of the images included in the group represented by the representative image selected by the representative image selection device in a list display window displayed on the display screen of the display apparatus in response to input of the list display command from the list display command input device, by a list display control device;

displaying a first slider on the display screen of the display apparatus in a movable manner on the display screen, by a first slider display control device; and determining images displayed in the list display window on the basis of a ratio or a number based on a moved position of the first slider, by a first image determining device, wherein displaying the list of images determined by the first image determining device in the list display window is performed by the list display control device.

15. A non-transitory recording medium storing a computer-readable program for controlling a computer of an image processing apparatus, the program causing the computer to execute steps comprising:

classifying a plurality of images into a plurality of groups for images similar to each other in response to a classification command;

displaying an image representing the group for each classified group on a display screen of a display apparatus;

selecting at least one representative image from among the displayed representative images;

displaying an image included in a group represented by the selected representative image on the display screen of the display apparatus;

inputting list display command;

displaying a list of the images included in the group represented by the selected representative image in a list display window displayed on the display screen of the display apparatus in response to input of the list display command;

displaying a first slider on the display screen of the display apparatus in a movable manner on the display screen; and determining images displayed in the list display window on the basis of a ratio or a number based on a moved position of the first slider, wherein the program further causes the computer to execute a step of displaying the list of images determined on the basis of the ratio or the number based on the moved position of the first slider in the list display window.

16. An image processing apparatus comprising:

an image classification device for classifying a plurality of images into a plurality of groups for images similar to each other in response to a classification command;

a representative image display control device for displaying an image representing the group for each group classified by the image classification device on a display screen of a display apparatus;

a representative image selection device for selecting at least one representative image from among representative images displayed under a control of the representative image display control device;

a similar image display control device for displaying an image included in a group represented by the representative image selected by the representative image selection device on the display screen of the display apparatus;

a list display command input device for inputting list display command;

a list display control device for displaying a list of the images included in the group represented by the representative image selected by the representative image selection device in a list display window displayed on the display screen of the display apparatus in response to input of the list display command from the list display command input device;

a first slider display control device for displaying a first slider on the display screen of the display apparatus in a movable manner on the display screen; and a first image determining device for determining images that are more similar among the images displayed in the list display window on the basis of a ratio or a number based on a moved position of the first slider, wherein the list display control device displays the list of images determined by the first image determining device in the list display window.

17. An image processing method comprising:

classifying a plurality of images into a plurality of groups for images similar to each other in response to a classification command, by an image classification device;

displaying an image representing the group for each group classified by the image classification device on a display screen of a display apparatus, by a representative image display control device;

selecting at least one representative image from among representative images displayed under a control of the representative image display control device, by a representative image selection device;

displaying an image included in a group represented by the representative image selected by the representative image selection device on the display screen of the display apparatus, by a similar image display control device;

inputting list display command, by a list display command input device;

displaying a list of the images included in the group represented by the representative image selected by the representative image selection device in a list display window displayed on the display screen of the display apparatus in response to input of the list display command from the list display command input device, by a list display control device;

displaying a first slider on the display screen of the display apparatus in a movable manner on the display screen, by a first slider display control device; and determining images that are more similar among the images displayed in the list display window on the basis of a ratio or a number based on a moved position of the first slider, by a first image determining device, wherein displaying the list of images determined by the first image determining device in the list display window is performed by the list display control device.

18. A non-transitory recording medium storing a computer-readable program for controlling a computer of an image processing apparatus, the program causing the computer to execute steps comprising:

classifying a plurality of images into a plurality of groups for images similar to each other in response to a classification command;

displaying an image representing the group for each classified group on a display screen of a display apparatus;

selecting at least one representative image from among the displayed representative images;

displaying an image included in a group represented by the selected representative image on the display screen of the display apparatus;

inputting list display command;

displaying a list of the images included in the group represented by the selected representative image in a list display window displayed on the display screen of the display apparatus in response to input of the list display command;

displaying a first slider on the display screen of the display apparatus in a movable manner on the display screen; and determining images that are more similar among the images displayed in the list display window on the basis of a ratio or a number based on a moved position of the first slider, wherein the program further causes the computer to execute a step of displaying the list of images determined on the basis of the ratio or the number based on the moved position of the first slider in the list display window.

* * * * *